US011638237B2

(12) United States Patent
Choi et al.

(10) Patent No.: US 11,638,237 B2
(45) Date of Patent: Apr. 25, 2023

(54) GEOMETRY-BASED LISTEN-BEFORE-TALK (LBT) SENSING FOR TRAFFIC-RELATED PHYSICAL RANGING SIGNALS

(71) Applicant: QUALCOMM Incorporated, San Diego, CA (US)

(72) Inventors: Chang-Sik Choi, Hillsborough, NJ (US); Kapil Gulati, Belle Mead, NJ (US); Sudhir Kumar Baghel, Hillsborough, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 192 days.

(21) Appl. No.: 17/098,882

(22) Filed: Nov. 16, 2020

(65) Prior Publication Data
US 2022/0159428 A1 May 19, 2022

(51) Int. Cl.
*H04W 72/04* (2023.01)
*H04W 4/40* (2018.01)

(52) U.S. Cl.
CPC ............. *H04W 72/04* (2013.01); *H04W 4/40* (2018.02)

(58) Field of Classification Search
CPC ............... H04L 5/0048; H04L 5/0053; H04L 5/0023; H04L 5/0078; H04W 72/042; H04W 4/40; H04W 72/0446; H04W 74/0808; H04W 72/04; H04W 72/048; H04W 72/0406; H04W 72/044
See application file for complete search history.

(56) References Cited

U.S. PATENT DOCUMENTS

| | | | |
|---|---|---|---|
| 2013/0136097 A1 | 5/2013 | Yu et al. | |
| 2018/0302280 A1 | 10/2018 | Jiang et al. | |
| 2018/0338000 A1* | 11/2018 | Weisman | H04L 67/12 |
| 2020/0404699 A1* | 12/2020 | Zheng | H04W 74/006 |
| 2020/0412507 A1* | 12/2020 | Vagner | H04L 5/0053 |
| 2021/0005085 A1* | 1/2021 | Cheng | G08G 1/0141 |
| 2021/0160656 A1* | 5/2021 | Choi | H04W 4/029 |
| 2021/0327280 A1* | 10/2021 | Choi | G08G 1/22 |

(Continued)

FOREIGN PATENT DOCUMENTS

| | | | | |
|---|---|---|---|---|
| CN | 105722231 B | * | 3/2019 | .......... H04W 72/048 |
| EP | 2503710 A1 | * | 9/2012 | .......... G07B 15/063 |

OTHER PUBLICATIONS

International Search Report and Written Opinion—PCT/US2021/071889—ISA/EPO—dated Feb. 11, 2022.

*Primary Examiner* — Allahyar Kasraian
(74) *Attorney, Agent, or Firm* — Weaver Austin Villeneuve & Sampson LLP/Qualcomm

(57) ABSTRACT

Techniques described herein provide for the efficient usage of an RF channel for PRS transmissions by performing LBT sensing for a group of one or more vehicles (e.g., V2X vehicles) in a predetermined area by using an RSU. The RSU can determine a sequence in which an order for each vehicle in the group to transmit a respective PRS is defined, and provide the sequence to the group. The RSU may further perform the LBT functionality by listening to availability on the RF channel and, when the channel becomes available, the RSU can initiate this sequence by sending an initial PRS. This LBT sensing for a group can provide far more efficient usage of the RF channel than if LBT functionality were performed by each divisional vehicle.

23 Claims, 8 Drawing Sheets

(56) References Cited

U.S. PATENT DOCUMENTS

| 2021/0392454 A1* | 12/2021 | Choi ........................ H04W 4/40 |
| 2022/0039080 A1* | 2/2022 | Khoryaev ............... H04W 4/40 |
| 2022/0053422 A1* | 2/2022 | Choi ........................ H04W 4/06 |

* cited by examiner

GEOMETRY-BASED LISTEN-BEFORE-TALK (LBT) SENSING FOR TRAFFIC-RELATED PHYSICAL RANGING SIGNALS

BACKGROUND

Vehicle-to-everything (V2X) is a communication standard for vehicles and related entities to exchange information regarding a traffic environment. V2X can include vehicle-to-vehicle (V2V) communication between V2X-capable vehicles, vehicle-to-infrastructure (V2I) communication between the vehicle and infrastructure-based devices (commonly-termed road side units (RSUs)), vehicle-to-person (V2P) communication between vehicles and nearby people (pedestrians, cyclists, and other road users), and the like. Further, V2X can use any of a variety of wireless radio frequency (RF) communication technologies. Cellular V2X (CV2X), for example, is a form of V2X that uses cellular-based communication such as long-term evolution (LTE), fifth generation new radio (5G NR), and/or other cellular technologies in a direct-communication mode as defined by the 3rd Generation Partnership Project (3GPP). A component or device on a vehicle, RSU, or other V2X entity that is used to communicate V2X messages is generically referred to as a V2X device or V2X user equipment (UE).

To help ensure the safety of V2X-capable vehicles ("V2X vehicles") and other nearby entities, V2X vehicles can determine their location and communicate this with other V2X-capable entities ("V2X entities," which can include V2X vehicles, RSUs, V2X-capable mobile phones, etc.). Absolute and/or relative location determination (e.g., to other V2X entities) can be made through the use of Physical Ranging Signals (PRSs), which are Radio Frequency (RF) signals transmitted by a transmitting V2X entity and received by receiving V2X entity, allowing for an accurate determination of distance between the transmitting and receiving V2X entities, which can complement the overall location determination process. Depending on the radio frequency (RF) spectrum/channel used, Listen-Before-Talk (LBT) functionality may be required for the transmittal of PRS.

BRIEF SUMMARY

Techniques described herein provide for the efficient usage of an RF channel for PRS transmissions by performing LBT sensing for a group of one or more vehicles (e.g., V2X vehicles) in a predetermined area by using an RSU. The RSU can determine a sequence in which an order for each vehicle in the group to transmit a respective PRS is defined, and provide the sequence to the group. The RSU may further perform the LBT functionality by listening to availability on the RF channel and, when the channel becomes available, the RSU can initiate this sequence by sending an initial PRS. This LBT sensing for a group can provide far more efficient usage of the RF channel than if LBT functionality were performed by each divisional vehicle.

An example method of LBT sensing for transmitting physical ranging signals among a plurality of vehicles, according to this disclosure, comprises obtaining, at a RSU, location information regarding the location for each vehicle of the plurality of vehicles, determining, based on the location information, that each vehicle of the plurality of vehicles is located within a section of a road associated with the RSU, creating a message. The message is indicative of a time for each vehicle of the plurality of vehicles to transmit a respective PRS. The method further comprises wirelessly transmitting the message.

An example RSU for LBT sensing and transmitting physical ranging signals among a plurality of vehicles, according to this disclosure, comprises a wireless communication interface, a memory, and one or more processing units communicatively coupled with the memory and the wireless communication interface. The one or more processing units are configured to obtain location information regarding the location for each vehicle of the plurality of vehicles, determine, based on the location information, that each vehicle of the plurality of vehicles is located within a section of a road associated with the RSU, and create a message. The message is indicative of a time for each vehicle of the plurality of vehicles to transmit a respective PRS. The one or more processing units are further configured to wirelessly transmit the message via the wireless communication interface.

An example device for LBT sensing and transmitting physical ranging signals among a plurality of vehicles, according to this description, comprises means for obtaining location information regarding the location for each vehicle of the plurality of vehicles, means for determining, based on the location information, that each vehicle of the plurality of vehicles is located within a section of a road associated with the RSU, and means for creating a message. The message is indicative of a time for each vehicle of the plurality of vehicles to transmit a respective PRS. The device further comprises means for wirelessly transmitting the message.

An example non-transitory computer-readable medium, according to this description, has instructions embedded therewith for LBT sensing and transmitting physical ranging signals among a plurality of vehicles. The instructions, when executed by one or more processing units, cause the one or more processing units to obtain location information regarding the location for each vehicle of the plurality of vehicles, determine, based on the location information, that each vehicle of the plurality of vehicles is located within a section of a road associated with the RSU, and create a message, wherein the message is indicative of a time for each vehicle of the plurality of vehicles to transmit a respective PRS. The instructions, when executed by one or more processing units, further cause the one or more processing units to wirelessly transmit the message.

Like reference symbols in the various drawings indicate like elements, in accordance with certain example implementations. In addition, multiple instances of an element may be indicated by following a first number for the element with a letter or a hyphen and a second number. For example, multiple instances of an element 110 may be indicated as 110-1, 110-2, 110-3 etc. or as 110*a*, 110*b*, 110*c*, etc. When referring to such an element using only the first number, any instance of the element is to be understood (e.g., element 110 in the previous example would refer to elements 110-1, 110-2, and 110-3 or to elements 110*a*, 110*b*, and 110*c*).

DETAILED DESCRIPTION

Several illustrative embodiments will now be described with respect to the accompanying drawings, which form a part hereof. While particular embodiments, in which one or more aspects of the disclosure may be implemented, are described below, other embodiments may be used and various modifications may be made without departing from the scope of the disclosure or the spirit of the appended claims.

As referred to herein, "V2X devices," "V2X vehicles," and "V2X entities" respectively refer to devices, vehicles, and entities capable of transmitting and receiving V2X messages. Similarly, "non-V2X vehicles" and "non-V2X entities" refer to vehicles and entities that do not or cannot engage in V2X communications. Further, a "V2X device," which is described in more detail herein, refers to a device, system, component, or the like, which may be incorporated into and/or used by a V2X entity to enable V2X communications. Although many embodiments described "V2X vehicles" and "non-V2X vehicles," it will be understood that many embodiments can be expanded to include non-vehicle entities, such as pedestrians, cyclists, road hazards, obstructions, and/or other traffic-related objects, etc. Further, it can be noted that embodiments may apply to vehicles and/or RSUs capable of traffic-related communication and PRS transmissions, and not necessarily to V2X-capable vehicles/RSUs. A person of ordinary skill in the art will appreciate such variations.

Figure 1:
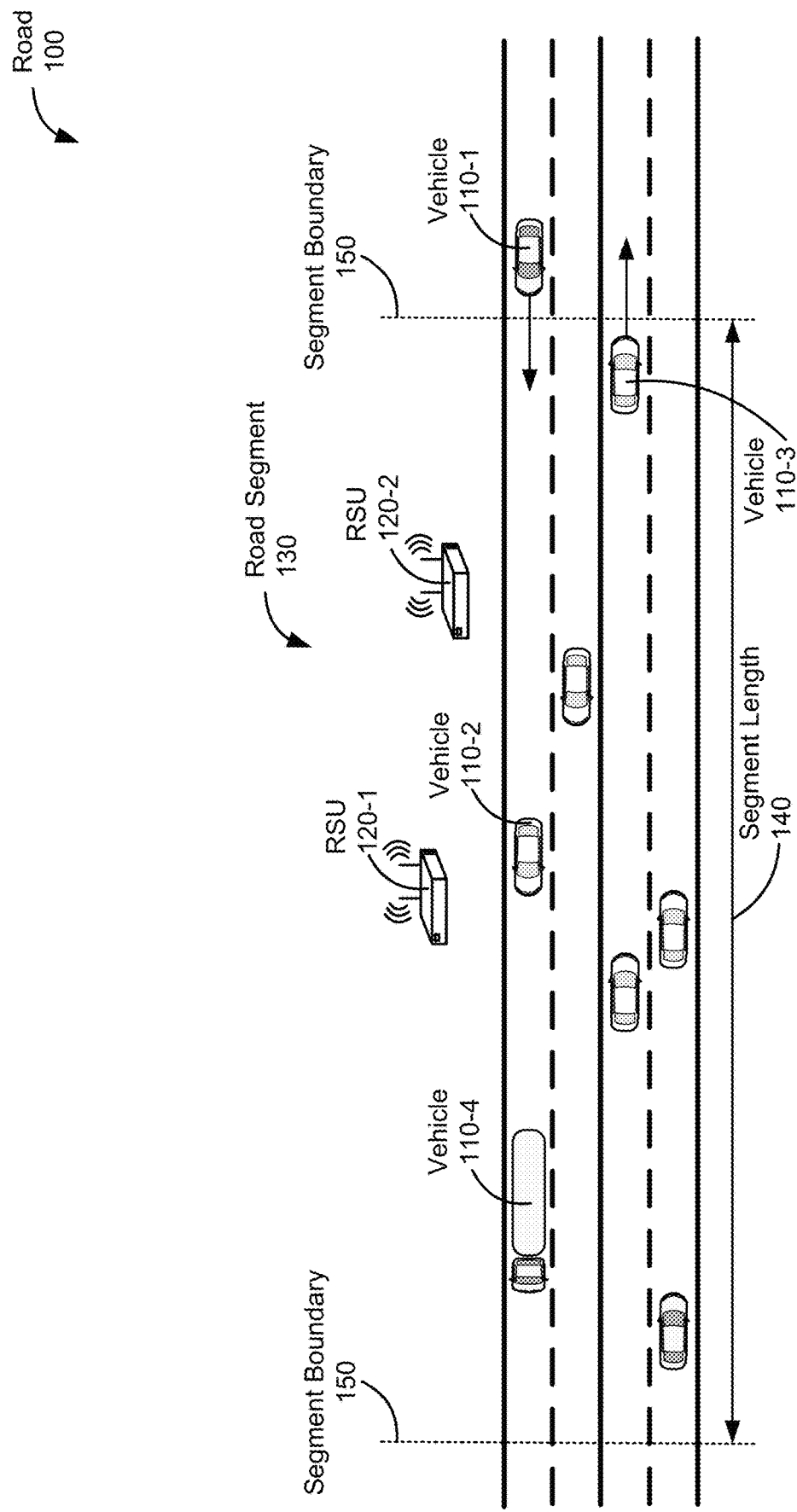
FIG. 1 is an illustration of an overhead view of a road, provided to help illustrate how LBT sensing for PRS signals among a group of vehicles can be performed by an RSU, according to an embodiment.

FIG. 1 is an illustration of an overhead view of a road 100, provided to help illustrate how LBT sensing for PRS signals among a group of vehicles can be performed by an RSU, according to an embodiment. Here, several vehicles 110-1, 110-2, 110-3, and 110-4 (collectively and generically referred to herein as vehicles 110) are driving along the road 100, and two RSUs 120-1 and 120-2 (collectively and generically referred to herein as RSUs 120) are located near the road 100. (To avoid clutter, only a portion of the vehicles 110 are labeled.) It will be understood that FIG. 1, as with other figures provided herein, is provided as a non-limiting example. As a person of ordinary skill in the art will appreciate, various characteristics of the roads (number of lanes, shape, directions, intersections, etc.) can vary, as can other aspects of FIG. 1. And of course, the location vehicles along the road 100 will vary as traffic conditions change.

As noted, vehicles 110 can communicate with each other, as well as with RSUs 120, using RF signals. Such communications can include beacons, indicative of where a vehicle 110 is located. In V2X, for example, these beacons may include a Basic Safety Message (BSM) or Cooperative Awareness Messages (CAM). In some embodiments, these beacons may be sent on a licensed spectrum, according to various applicable protocols and standards. The vehicle 110 may determine its location based on one or more of a variety of location-determination techniques. This can include, for example, Global Navigation Satellite System (GNSS) location determination, trilateration or triangulation using terrestrial transceivers (e.g., Wide Area Network (WAN)-based Observed Time Difference Of Arrival, techniques utilizing Round-Trip Time (RTT) determination, Receive Signal Strength Indication (RSSI), Angle of Arrival (AoA) and/or Angle of Departure (AoD), and the like), image-based location determination (e.g., comparing images with high definition map data), sensor-based location determination (e.g., using accelerometers, gyroscopes, magnetometers, etc.), or the like. Vehicles 110 may utilize data fusion to incorporate a plurality of location-determination techniques to determine its final location, which may be broadcast or otherwise mitigated using beacons or similar wireless techniques.

PRS can also be used for location determination. In particular, as noted, a PRS can be transmitted by a transmitting entity and received by one or more receiving entities to determine a distance between the transmitting and receiving entities. For example, vehicle 110 receiving a PRS (a "receiving vehicle") may determine its distance from a vehicle 110 transmitting a PRS (a "transmitting vehicle") by using the PRS transmitted by the transmitting vehicle 110 in an RTT distance determination (in which case the receiving vehicle 110 may send a responsive PRS), or by calculating the distance based on time of arrival (TOA) (e.g., if transmitting and receiving vehicles 110 are synchronized, or if a time difference between the transmitting and receiving vehicles 110 is known). Depending on the type of distance determination used, these distance determinations may also involve pre- and/or post-PRS communications between receiving and transmitting vehicles.

The various characteristics of PRS usage can vary, depending on desired functionality. In embodiments in which a high accuracy is desired, a correspondingly high-bandwidth PRS signal may be used. In some embodiments, for example, it may be desirable to have a bandwidth of signal of at least 40 MHz. In other embodiments, a 100 MHz bandwidth may be desirable. (Alternative embodiments may have higher or lower bandwidth usage, depending on desired functionality.) Additionally or alternatively, a vehicle 110 may transmit PRS periodically, again depending on desired functionality. In some embodiments, for example, a vehicle may transmit a PRS approximately every 100 ms. (Again, alternative embodiments may have a higher or lower periodicity, depending on desired functionality. Moreover, periodicity for PRS transmissions in a given road segment 130 may increase or decrease over time, depending on traffic conditions, available bandwidth, etc.) Additionally or alternatively, PRS may be transmitted by vehicles upon certain triggering events. This can include when the vehicle may need to provide a location update (e.g., if the vehicle has traveled a threshold distance from the time it previously communicated its location).

Because of the bandwidth, periodicity, and/or other characteristics of PRS, it may be desirable in some embodiments to send PRS transmissions on a different RF channel than beacons. As noted, in some embodiments, beacons may be sent on a licensed spectrum, which may be designated for vehicle-related communications (e.g., V2X communications). On the other hand, PRS transmissions may be sent on an unlicensed spectrum or a separate licensed spectrum. In some embodiments, for example, PRS transmissions may be sent using the Unlicensed National Information Infrastructure (U-NII)-3 spectrum. However, for access to certain spectra (such as U-NII 3) devices may be required to use LBT functionality, listening to determine a channel is available before transmitting on the channel.

Performing LBT may be done in a variety of ways. For example, each individual device may autonomously perform LBT by listening to the channel to determine if it is available before transmitting on the channel. If multiple devices are communicating on the same channel, however, this form of LBT can be inefficient. In situations such as the traffic scenario illustrated in FIG. 1, these inefficiencies can result in sporadic PRS usage and reduced position accuracy. As an alternative, LBT may be sensed for a group comprising an initiator device and one or more responder devices. In this form of LBT, the initiator device checks the channel and reserves the channel for transmittal not only of its PRS, but also the transmittal of PRS is by all the responder devices as well.

With this in mind, embodiments provide for geometry-based division of the road 100. More specifically, the segmentation of the road 100 into multiple segments, where each road segment has a corresponding RSU that performs LBT sensing for a group comprising the various vehicles on that segment. That is, for a given road segment 130, an RSU 120-1 can form an LBT group from the vehicles 110 on the road segment 130, and perform LBT sensing for that group.

The size of the segments (e.g., segment length 140) may be based on distance of communications, traffic speed, periodicity of PRS, and/or other factors. For example, efficiencies in an LBT group may be reduced if the members of the LBT group frequently change. Additionally, if the segment length 140 is significantly smaller than the distance PRS signals can travel, the likelihood of interference between adjacent segments of the road 100 may increase. With these factors in mind, some embodiments may divide the road 100 into a plurality of road segments 130 in which the segment length 140 of each segment 130 is on the order of 200 m. That said, alternative embodiments may have a longer or shorter segment length 140, depending on desired functionality. Additionally, according to some embodiments, inter-segment interference may further be reduced by choosing segment boundaries 150 so that adjacent road segments 130 do not overlap. (That is, segment boundaries 150 between two adjacent road segments 130 may act as boundaries for both road segments 130.)

As illustrated, there may be a plurality of RSUs 120 adjacent to a given road segment 130. In such instances, embodiments may designate a single RSU 120 to act as the LBT group initiator for vehicles 110 located on the road segment 130. In determining which RSU 120 to designate, embodiments may prioritize RSUs 120 having the highest average Signal-to Noise Ratio (SNR) at both ends of a road segment 130. As such, these RSUs 120 tend to be located near the centroid of the road segment 130. (Alternatively, the RSU 120 for a given road segment 130 may be selected solely based on position, as being located closest to the centroid or center of the road segment 130). In FIG. 1, for example, RSU 120-1 may be designated as the LBT group initiator because it may have a higher average SNR for PRS at both segment boundaries 150 than RSU 120-2. It should be appreciated that road segments 130 of different shapes (e.g., having curves, intersections, roundabouts, etc.) may have multiple and/or differently-shaped segment boundaries 150 to consider when determining the average SNR.

According to some embodiments, in which a road segment 130 may have a plurality of RSUs 120, a first RSU 120 may be chosen as a primary RSU, and a second RSU 120 may be chosen as a secondary RSU. (A tertiary, quaternary, etc. RSUs may also be designated, depending on desired functionality.) In FIG. 1, for example, RSU 120-1 may be designated as the primary RSU, and RSU 120-2 may be designated as the secondary RSU. In such instances, if the primary RSU 120-1 is unable to act as the LBT group initiator for the road segment 130, the secondary RSU 120-2 may act as LBT group initiator. For example, if PRS transmissions from the primary RSU 120-1 are blocked or the primary RSU 120-1 is otherwise incapable of transmitting PRS transmissions, the primary RSU 120-1 may communicate this inability to the secondary RSU 120-2 (e.g., using a separate RF band and/or form of wireless medications), or the secondary RSU 120-2 may simply detect this inability by the primary RSU 120-1. In such instances, the secondary RSU 120-2 can perform the LBT sensing as described herein until the primary RSU 120-1 is back online.

Generally put, the RSU 120 creating the LBT group can send LBT information to the vehicles 110 on the road segment 130. The LBT information may include information about the group, and may be updated upon triggering events, such as when a vehicle (e.g. vehicle 110-1) enters the road segment 130 and/or when a vehicle (e.g., vehicle 110-3) leaves the road segment 130. As previously indicated, the RSU 120 can further initiate the sequence of PRS transmission by vehicles 110 in the group by sending and initiating PRS signal once determining the channel for sending PRS signals is available. Each vehicle 110 in the LBT group can then respond by sending out a respective PRS signal in the respective timeslot for that vehicle 110, as indicated in the LBT information sent by the RSU 120. Additional details are provided below, with regard to FIG. 2.

Figure 2:
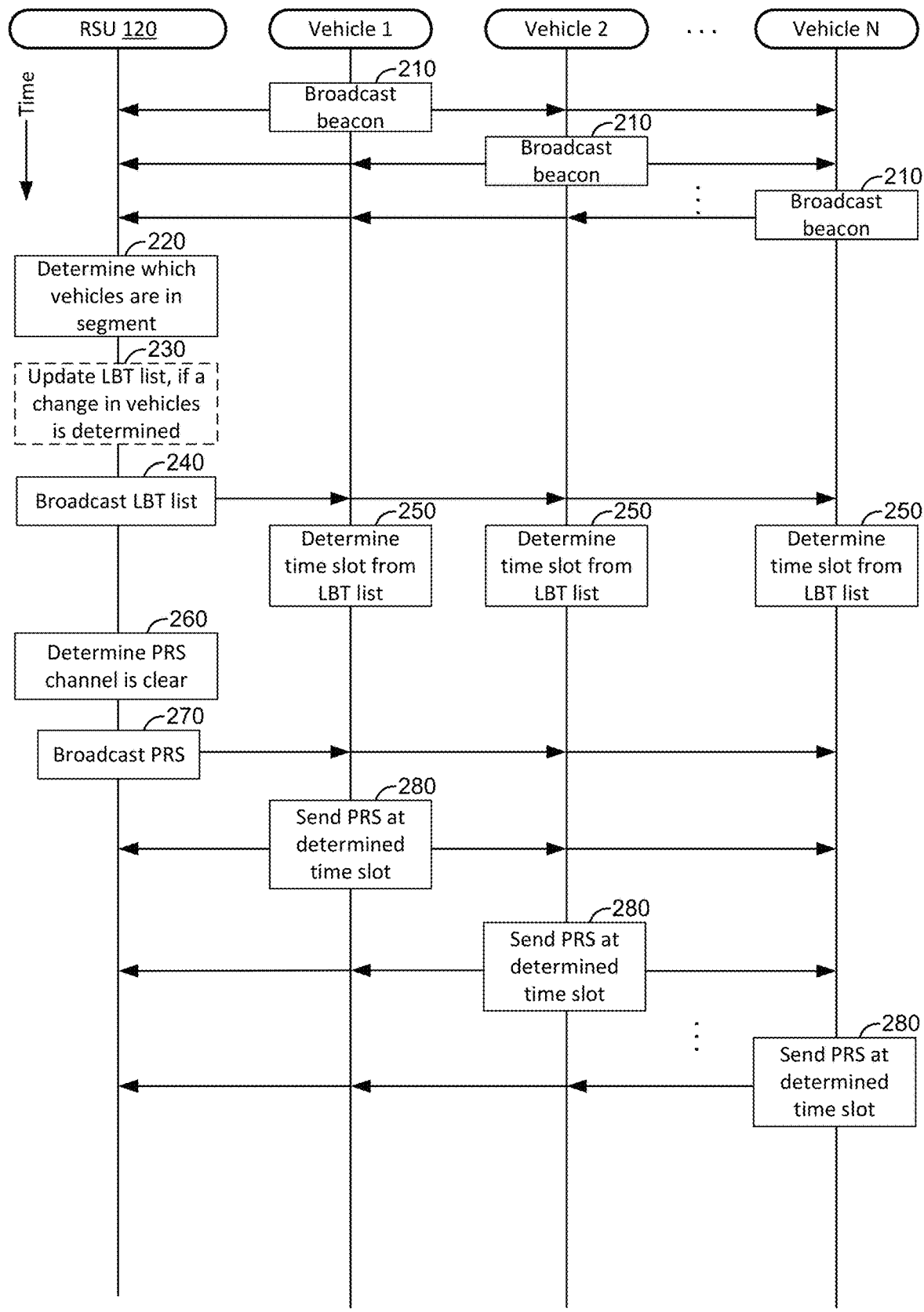
FIG. 2 is a sequence diagram illustrating a process by which an RSU can perform LBT sensing for PRS transmissions for a group of vehicles, according to an embodiment.

FIG. 2 is a sequence diagram illustrating a process by which an RSU can perform LBT sensing for PRS transmissions for a group of vehicles, according to an embodiment. Here, FIG. 2 illustrates the functions and communications between an RSU 120 and any N vehicles. It can be noted that although FIG. 2 indicates that the number of vehicles, N, may be at least 3, traffic scenarios may be such that N is 2, 1, or even 0. The RSU 120 illustrated in FIG. 2 may correspond to the RSU 120-1 corresponding the LBT functionality among vehicles 110 of FIG. 1, although such functionality may be performed by a secondary, tertiary, quaternary, etc. RSU 120, if necessary. Vehicles 1-N may correspond to any of vehicles 110 within the road segment 130 corresponding to the RSU 120, as illustrated in FIG. 1.

The functionality of blocks 210 comprises each of the vehicles broadcasting a beacon, which may be received by the other vehicles, and the RSU 120. As previously noted, such beacons may comprise regularly-transmitted messages under V2X and/or other communication protocols or standards. Moreover, as also noted, in some embodiments such beacons may be broadcast utilizing a licensed RF channel. As such, they may be broadcast in such a manner (e.g., in accordance with governing protocols and/or standards for that RF channel) to minimize interference with other broadcast beacons. Alternatively, depending on desired functionality, each vehicle may send the RSU 120 a beacon directly (rather than via broadcast). To identify the vehicle, the beacon may also include an identifier for the vehicle (e.g., Vehicle Identification Number (VIN), serial number, Media Access Control (MAC) address, Globally Unique Identifier (GUID), etc.).

The beacon for each vehicle may be indicative of the location of that respective vehicle. Depending on desired functionality, this may comprise absolute coordinates (e.g., latitude and longitude), location relative to a fixed point (e.g., RSU 120, centerpoint of road segment 130, etc.), and/or location relative to one or more moving entities (e.g., other vehicles). As noted, this location may be determined using a GNSS receiver, sensors, and/or other information (including previously-transmitted PRS from other vehicles 110 and/or RSUs 120).

At block 220, the RSU 120 determines which vehicles are in the segment. This determination can be made by comparing the location of the vehicles (e.g., as received in the beacons provided by the vehicles) with segment boundaries 150. If, for example, the RSU 120 determines vehicles to be within the boundaries of the road segment 130 corresponding to the RSU 120, the RSU 120 can then determine to include the vehicles on an LBT list, which indicates the vehicles to include in the LBT group for the road segment 130.

At block 230, the RSU may optionally update the LBT list if a change in vehicles is determined. That is, as previously noted, if a vehicle enters the road segment 130 (e.g., vehicle 110-1 of FIG. 1) and/or a vehicle leaves the road segment 130 (e.g., vehicle 110-3 of FIG. 1), the list of vehicles to include in the LBT list may change. Additionally or alternatively, changes to the LBT list may include where the RSU 120 no longer knows whether a vehicle is on the road segment 130 (e.g., due to the vehicle no longer sending beacons, beacon signals being blocked and/or experiencing noise/interference, etc.). If no changes to the LBT list are needed, the RSU 120 may resort to a previously-made LBT list.

In addition to including a list of the vehicles in the LBT group, the LBT list can also provide an indication of when each vehicle is to broadcast its respective PRS. As noted, the broadcasting of PRS signals by the LBT group can be initiated by an initiating PRS transmitted by the RSU 120. Thus, the LBT list may include timing information for each vehicle to transmit its respective PRS, relative to the time the initiating PRS is transmitted. Additionally or alternatively, the list may contain an order in which vehicles are to transmit their respective PRS, and each vehicle may transmit its respective PRS after detecting the PRS from the preceding vehicle, as specified by the LBT list. Alternative embodiments may include additional or alternative forms of communicating such timing information in the LBT list.

The determination of the order of vehicles in the LBT list (or, more accurately the order in which vehicles in the LBT group are to transmit their PRS) may vary, depending on desired functionality. In some embodiments or scenarios, the order may be random, or simply associated with another order (e.g., the order in which beacons are received by the RSU 120, and order in which vehicles enter and/or exit the road segment 130, etc.). In other embodiments or scenarios, the order of vehicles on the LBT list may be determined by the RSU 120 to help facilitate and/or optimize PRS transmissions. In some embodiments, for example, if the number of vehicles 110 reaches a certain threshold (e.g., a limit to the amount of vehicles that can transmit PRS signals while maintaining a desired periodicity of PRS transmittals (e.g., 100 ms)), the RSU 120 may order the LBT list. This order may vary, depending on any of a variety of factors. Additional details are provided below, in reference to FIG. 3.

Figure 3:
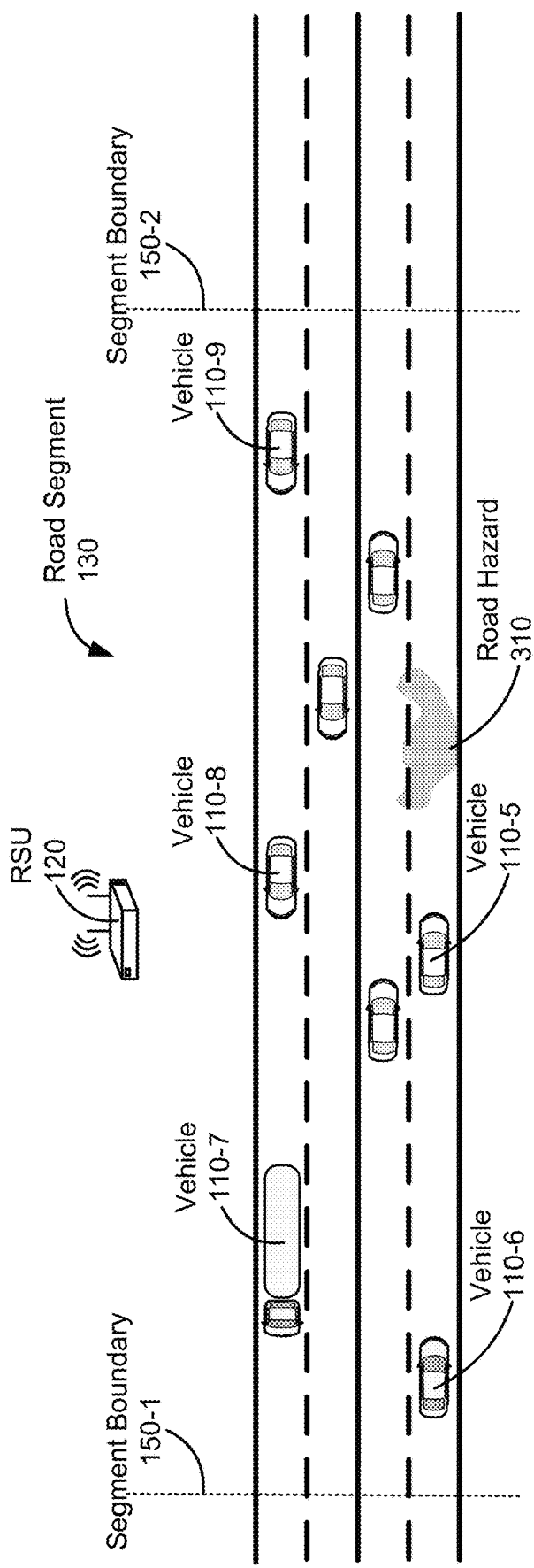
FIG. 3 is an overhead view similar to FIG. 1, showing a road segment with a corresponding RSU and multiple vehicles.

FIG. 3 is an overhead view similar to FIG. 1, showing a road segment 130 with a corresponding RSU 120 and multiple vehicles 110. (Again, not all vehicles 110 are labeled, to avoid clutter.) As noted, the RSU 120 can, after receiving location information from each of the vehicles 110 on the road segment 130, determine an order for the LBT list based on one or more of a variety of factors.

One such factor may involve vehicle safety and/or vehicle maneuverability. Because the determination of the location or distance of the transmitting vehicle is determined by the receiving vehicle, it may be desirable to prioritize PRS transmissions by vehicles determined to be "less safe" and/or "less maneuverable" because it may make it safer for all vehicles 110 on the road. For example, a first vehicle 110-5 that is relatively close to a road hazard 310 (e.g., an oil slick, patch of ice or gravel, pothole, object in the road, etc.) may be prioritized on the LBT list over (e.g., received an earlier time slot than) a second vehicle 110-6. Similarly, a relatively large vehicle 110-7 (in terms of size and/or weight) may be prioritized over a relatively small vehicle 110-8. Additionally or alternatively, speed may be a factor, such that vehicles 110 traveling at higher speeds are prioritized over vehicles 110 traveling at lower speeds.

Additionally or alternatively, location may be another factor. That is, similar to the selection of the RSU, vehicles 110 may also be prioritized based on determined or expected signal strength at segment boundaries 150. A vehicle 110-8 located closer to the center of the road segment 130, for example, may be prioritized over a vehicle 110-6 that is closer to a segment boundary 150. This helps prioritized signals that are more likely to be detected by all vehicles 110 in the road segment 130. (A PRS from a vehicle 110-8 located near the center of the road segment 130 is likely to be detected by all vehicles 110, whereas it is less likely for a PRS transmitted by a vehicle 110-6 near a segment boundary 150-1 on a first side of the road segment 130 to be detected by a vehicle 110-9 near a segment boundary 150-2 on the opposite side of the road segment 130.) Additionally, prioritizing vehicles 110 in this manner on the LBT list can help reduce inter-segment interference because (as previously noted with regard to RSUs 110) a PRS from a vehicle 110-8 located near the center of the road segment 130 is less likely to cause interference in an adjacent road segment 130 than a PRS from a vehicle 110-6, 110-9 near a segment boundary 150.

Additionally, the reduction of multipath in combination with the location of vehicles 110 may be another factor. There may be some locations along the road segment 130, for example, near surfaces of objects that may be highly reflective or obstructive to a PRS transmitted via vehicle 110 at or near those locations. (These objects may include mobile objects, such as other vehicles 110.) On the other hand, there may be other locations that are far less likely to experience multipath. Accordingly, the RSU 120 may determine the LBT list by prioritizing vehicles at locations that are less likely to experience multipath over vehicles at locations that are more likely to experience multipath.

Returning to FIG. 2, the functionality at block 240 comprises the RSU 120 broadcasting the LBT list. At blocks 250, each vehicle determines its timeslot from the LBT list. In some embodiments, the RSU 120 may not broadcast an updated LBT list (e.g., at block 240) if no changes have been made to the LBT list. In such instances, each vehicle may retain its determined timeslot based on a previously-broadcast LBT list, and subsequently broadcast a PRS signal in the appropriate timeslot if an initiating PRS signal from the RSU 120 is detected.

It can also be noted that the size of the LBT list (broadcast at block 240) and the beacons (broadcast at blocks 210) can be optimized to accommodate the periodicity of PRS transmissions, depending on desired functionality. That is, to achieve a periodicity of 100 ms, the overall size of the LBT list and/or beacons may be relatively small to help ensure the RSU 120 and vehicles 1-N are capable of communicating the LBT list and beacons in under 100 ms. (To achieve a periodicity of 200 ms, there may be fewer restrictions on beacon and/or LBT list size.)

The functionality at block 260 comprises the RSU determining whether the PRS channel is clear. As noted, the PRS channel (the channel in which PRS signals are transmitted) may be different than the channel in which the beacons are broadcast (at blocks 210) and/or the channel in which the LBT list is broadcast (at block 240). Again, this can lead to efficiencies in the overall system because the RSU 120, as initiator for the LBT group, determines whether the PRS channel is clear. The vehicles do not need to make this determination.

At block 270, the RSU 120 broadcasts a PRS. As noted, this PRS may comprise an initiating PRS which, when detected by vehicles 1-N, acts as a trigger and reference for each vehicle to respond at its appropriate timeslot. In some embodiments, depending on protocol for the PRS channel, the RSU 120 may first reserve a timeslot for that channel for PRS transmissions by the entire LBT group (the RSU 120 and all vehicles 1-N).

In some embodiments, RSUs 120 of adjacent road segments 130 may be capable of communicating to each other. In such instances, the timing of the broadcast of the PRS at block 270 may be coordinated with RSUs 120 of adjacent road segments 130 to help minimize interference between PRS transmissions in adjacent road segments 130. That is, the broadcast PRS 270 of RSUs 120 of adjacent road segments 130 may be offset to help reduce inter-segment interference of PRS transmissions.

At blocks 280, each vehicle sends its own PRS at its determined timeslot. Again, the order of these PRS transmissions can be determined by the RSU 120, according to any of a variety of factors, and thus, the order may change as traffic conditions change. Further, although not expressly shown, additional RSUs 120 (e.g., a secondary RSU, tertiary RSU, etc.) may be included in the LBT group as responding devices, and may respond to the initiating PRS (broadcast at block 270) by the RSU 120.

Figure 4:
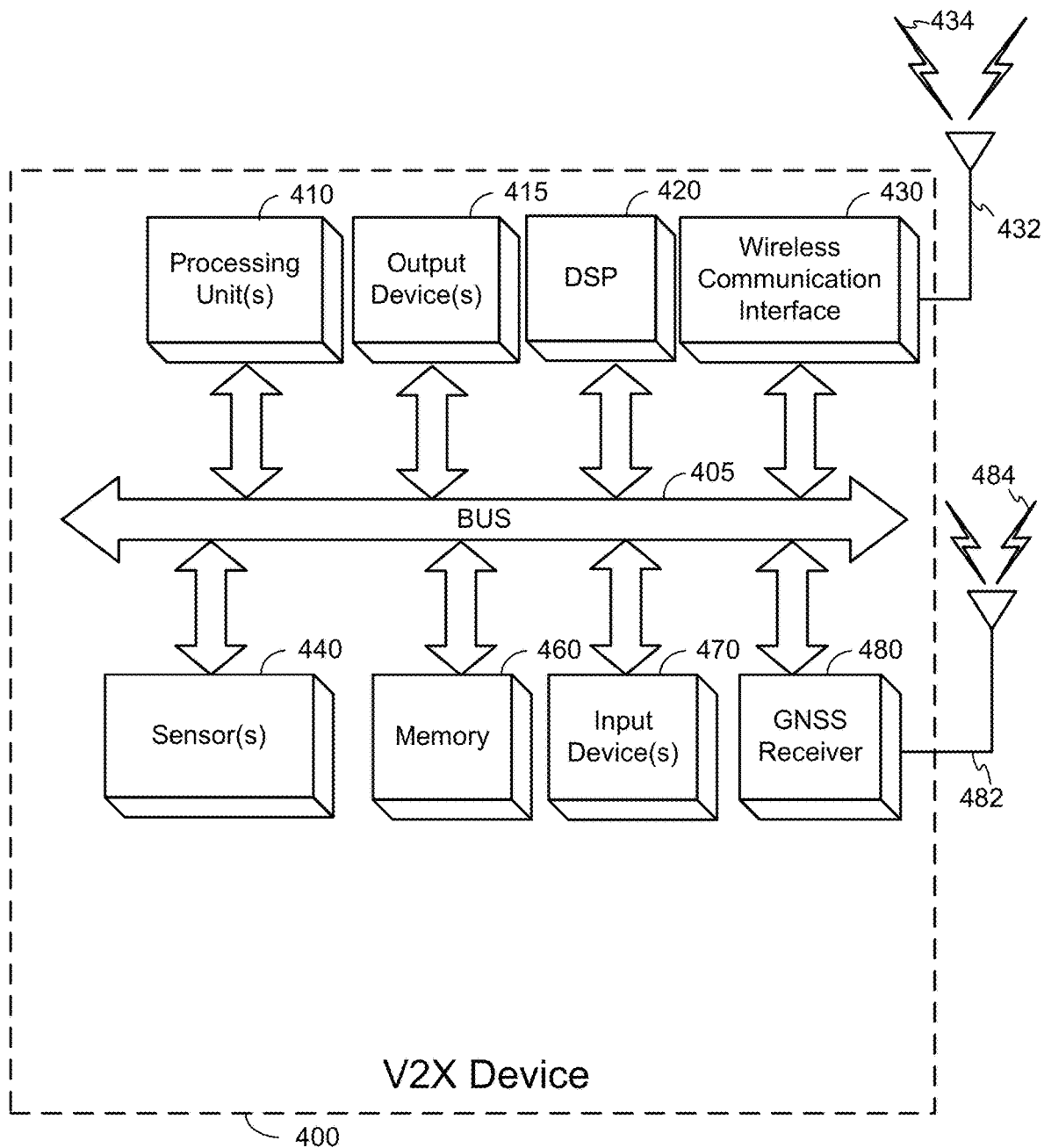
FIG. 4 is a block diagram of an embodiment of a V2X device, which may be utilized by an RSU and/or vehicle to wirelessly communicate with vehicles and/or RSUs as described herein.

FIG. 4 is a block diagram of an embodiment of a V2X device 400, which may be utilized by an RSU 120 and/or vehicle 110 to wirelessly communicate with vehicles 110 and/or RSUs as previously described. When utilized by a vehicle 110, the V2X device 400 may comprise or be integrated into a vehicle computer system used to manage one or more systems related to the vehicle's navigation and/or automated driving, as well as communicate with other onboard systems and/or other traffic entities. When utilized by an RSU 120, the V2X device 400 may cause the RSU 120 to perform the LBT-related functionality described above with regard to FIGS. 1-3, and/or one or more of the functions of method 500 shown in FIG. 5, which is later described. Moreover, the V2X device 400 may be integrated into an RSU computer system, which may include additional components and may perform additional RSU-related functionality. Such RSU-related functionality and additional components of an RSU are described in more detail below with regard to FIG. 6. With this in mind, according to some embodiments, the V2X device 400 may comprise a stand-alone device or component of a vehicle 110 or RSU 120, which may be communicatively coupled with other components/devices of the vehicle 110 or RSU 120. It also can be noted that the V2X device 400 may be utilized in the similar manner by V2X entities other than a vehicle 110 or RSU 120. Additionally, as previously noted, embodiments may not necessarily be limited to V2X communications. As such, alternative embodiments may include a device similar to the V2X device 400, having similar components to those shown in FIG. 4 and capable of performing the functions of the vehicles 110 and/or RSU 120 described in the previously-discussed embodiments, but without V2X functionality.

It should also be noted that FIG. 4 is meant only to provide a generalized illustration of various components, any or all of which may be utilized as appropriate. It can be noted that, in some instances, components illustrated by FIG. 4 can be localized to a single physical device and/or distributed among various networked devices, which may be located, for example, at different physical locations on a vehicle 110, RSU 120, or other V2X entity.

The V2X device 400 is shown comprising hardware elements that can be electrically coupled via a bus 405 (or may otherwise be in communication, as appropriate). The hardware elements may include a processing unit(s) 410 which can include without limitation one or more general-purpose processors, one or more special-purpose processors (such as digital signal processing (DSP) chips, graphics acceleration processors, application-specific integrated circuits (ASICs), and/or the like), and/or other processing structure or means. As shown in FIG. 4, some embodiments may have a separate Digital Signal Processor (DSP) 420, depending on desired functionality. In embodiments where a sensor processing unit 340 (as illustrated in FIG. 3 and previously described) is integrated into the V2X device 400, the processing unit(s) 410 may comprise the sensor processing unit 340.

The V2X device 400 also can include one or more input devices 470, which can include devices related to user interface (e.g., a touch screen, touchpad, microphone, button(s), dial(s), switch(es), and/or the like) and/or devices related to navigation, automated driving, and the like. Similarly, the one or more output devices 415 may be related to interacting with a user (e.g., via a display, light emitting diode(s) (LED(s)), speaker(s), etc.), and/or devices related to navigation, automated driving, and the like.

The V2X device 400 may also include a wireless communication interface 430, which may comprise without limitation a modem, a network card, an infrared communication device, a wireless communication device, and/or a chipset (such as a Bluetooth® device, an IEEE 802.11 device, an IEEE 802.15.4 device, a Wi-Fi device, a WiMAX device, a WAN device and/or various cellular devices, etc.), and/or the like. (Examples of such communication are provided in FIG. 6 and described in more detail below.) The wireless communication interface 430 can enable the V2X device 400 to communicate to other V2X devices. This can include the various forms of communication of the previously-described embodiments, including FIG. 2. And as such, it may be capable of broadcasting beacons, the LBT list, and/or PRS transmissions (depending on whether the V2X device 400 is incorporated into a vehicle 110 or RSU 120). Accordingly, the wireless communication interface 430 may be capable of sending and/or receiving RF signals from various RF channels/frequency bands. Communication using the wireless communication interface 430 can be carried out via one or more wireless communication antenna(s) 432 that send and/or receive wireless signals 434.

The V2X device 400 can further include sensor(s) 440. Sensors 440 may comprise, without limitation, one or more inertial sensors and/or other sensors (e.g., accelerometer(s), gyroscope(s), camera(s), magnetometer(s), altimeter(s), microphone(s), proximity sensor(s), light sensor(s), barometer(s), and the like). Sensors 440 may be used, for example, to determine certain real-time characteristics of the vehicle, such as location, velocity, acceleration, and the like. As previously indicated, sensor(s) 440 may be used to help a vehicle 110 determine its location.

Embodiments of the V2X device 400 may also include a GNSS receiver 480 capable of receiving signals 484 from one or more GNSS satellites using an antenna 482 (which, in some embodiments, may be the same as antenna 432). Positioning based on GNSS signal measurement can be utilized to determine a current location of the V2X device 400, and may further be used as a basis to determine the location of a detected object. The GNSS receiver 480 can extract a position of the V2X device 400, using conventional techniques, from GNSS satellites of a GNSS system, such as Global Positioning System (GPS) and/or similar satellite systems.

The V2X device 400 may further comprise and/or be in communication with a memory 460. The memory 460 can include, without limitation, local and/or network accessible storage, a disk drive, a drive array, an optical storage device, a solid-state storage device, such as a random access memory (RAM), and/or a read-only memory (ROM), which can be programmable, flash-updateable, and/or the like. Such storage devices may be configured to implement any appropriate data stores, including without limitation, various file systems, database structures, and/or the like.

The memory 460 of the V2X device 400 also can comprise software elements (not shown in FIG. 4), including an operating system, device drivers, executable libraries, and/or other code, such as one or more application programs, which may comprise computer programs provided by various embodiments, and/or may be designed to implement methods and/or configure systems as described herein. Software applications stored in memory 460 and executed by processing unit(s) 410 may be used to implement the functionality of a vehicle 110 or RSU 120 as previously described. Moreover, one or more procedures described with respect to the method(s) discussed herein may be implemented as code and/or instructions in memory 460 that are executable by the V2X device 400 (and/or processing unit(s) 410 or DSP 420 within V2X device 400), including the functions illustrated in the method 500 of FIG. 5 described below. In an aspect, then, such code and/or instructions can be used to configure and/or adapt a general-purpose computer (or other device) to perform one or more operations in accordance with the described methods.

Figure 5:
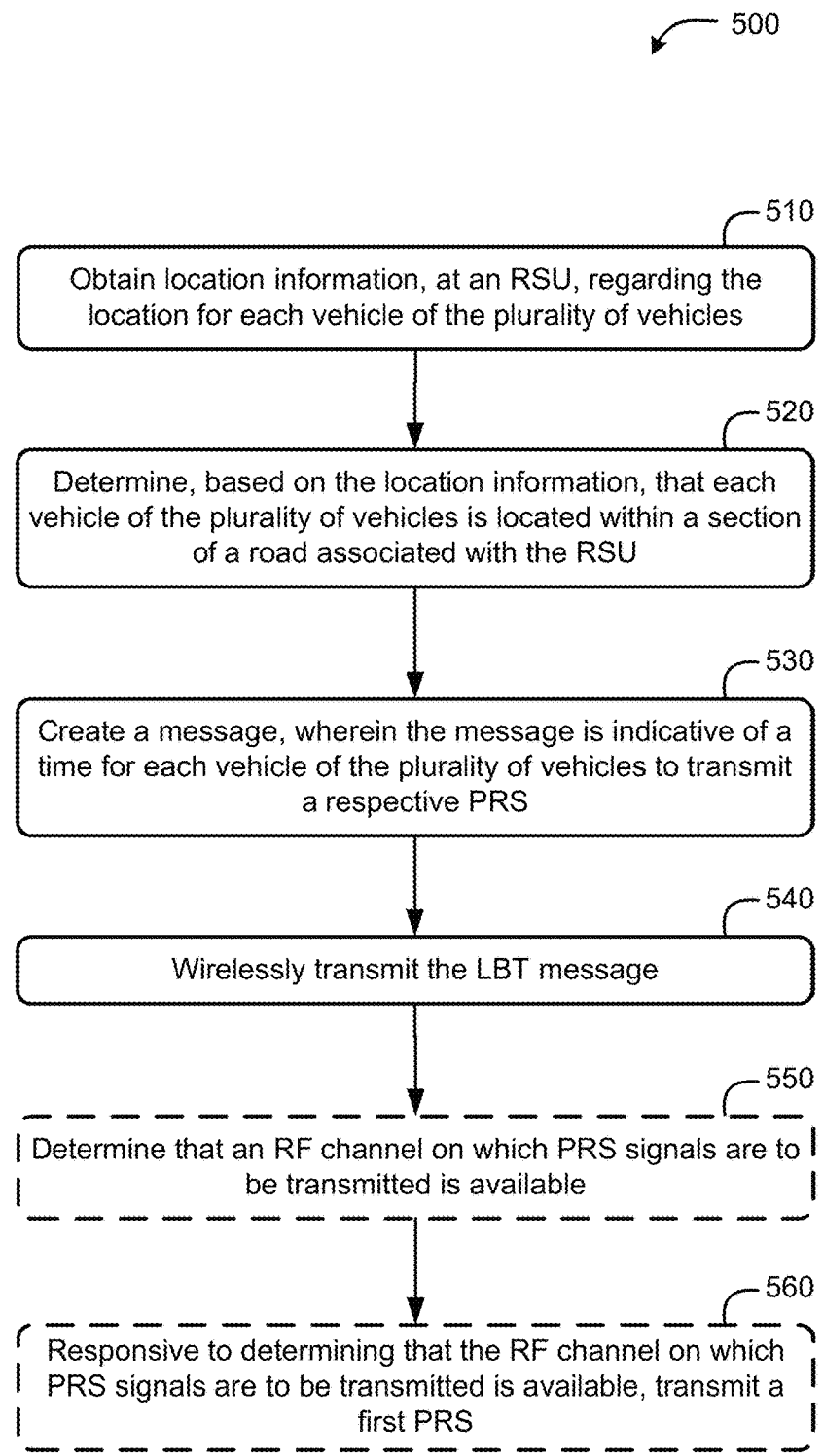
FIG. 5 is a flow diagram of a method of LBT sensing for PRS transmissions among a plurality of vehicles, according to embodiment.

FIG. 5 is a flow diagram of a method 500 of LBT sensing for PRS transmissions among a plurality of vehicles, according to an embodiment. Alternative embodiments may vary in function by combining, separating, or otherwise varying the functionality described in the blocks illustrated in FIG. 5. The method 500 of FIG. 5 illustrates how the functionality of an RSU 120 as shown in FIG. 2 and described above may be implemented, according to an embodiment. As such, the means for performing the functionality of one or more of the blocks illustrated in FIG. 5 may comprise hardware and/or software components of an RSU 120, which (as previously noted) may include one or more components of the V2X device 400 illustrated in FIG. 4 and described above.

At block 510, the functionality comprises obtaining location information, at an RSU, regarding the location for each vehicle of the plurality of vehicles. As noted in the above-described embodiments, this may comprise obtaining location information from beacons or other messages, which may be broadcast or otherwise communicated to an RSU from the plurality of vehicles. Thus, according to some embodiments, the method 500 may further comprise wirelessly receiving, at the RSU, a beacon from each vehicle of the plurality of vehicles. Means for performing the functionality at block 510 may include one or more software and/or hardware components of an RSU, such as a bus 405, processing unit(s) 410, memory 460, wireless communication interface 430, and/or other software and/or hardware components of the V2X device 400 illustrated in FIG. 4.

The functionality at block 520 comprises determining, based on the location information, that each vehicle of the plurality of vehicles is located within a section of road associated with the RSU. As illustrated in FIG. 1, and RSU 120 may be capable of determining whether vehicles 110 are within the segment boundaries 150 of a road segment 130, to determine whether vehicles 110 may be added to an LBT list. Means for performing the functionality at block 520 may include one or more software and/or hardware components of an RSU, such as a bus 405, processing unit(s) 410, memory 460, and/or other software and/or hardware components of the V2X device 400 illustrated in FIG. 4.

At block 530 the functionality comprises creating a message, where the message is indicative of a time for each vehicle of the plurality of vehicles to transmit a respective PRS. This message may comprise the LBT list described in the embodiments above, and may identify vehicles using any of a variety of identifiers (e.g., the identifiers used by the vehicles' beacons.) As noted, the order of this list (or more specifically, the order in which vehicles are to transmit their respective PRS) may be random, or may be deliberately determined by the RSU, based on any of a variety of factors as previously described. Moreover, the message may communicate the time at which each vehicle is to transmit its respective PRS in any of a variety of ways, depending on desired functionality. Thus, according to some embodiments, the time for each vehicle of the plurality of vehicles to transmit a respective PRS comprises an order of the plurality of vehicles and/or a timeslot for each vehicle of the plurality of vehicles. Means for performing the functionality at block 530 may include one or more software and/or hardware components of an RSU, such as a bus 405, processing unit(s) 410, memory 460, and/or other software and/or hardware components of the V2X device 400 illustrated in FIG. 4.

The functionality at block 540 comprises wirelessly transmitting the message. This may comprise broadcasting the message (comprising the LBT list) in the manner illustrated in FIG. 2. As noted, according to some embodiments, the LBT list may be broadcast on a licensed spectrum. Means for performing the functionality at block 540 may include one or more software and/or hardware components of an RSU, such as a bus 405, processing unit(s) 410, memory 460, wireless communication interface 430, and/or other software and/or hardware components of the V2X device 400 illustrated in FIG. 4.

At block 550 the functionality optionally comprises determining that an RF channel on which PRS signals are to be transmitted is available. As noted, as the initiator device in an LBT group, the RSU can do this for the entire group, rather than each vehicle performing this LBT functionality individually. According to some embodiments, the message may be wirelessly transmitted on a different RF channel than the RF channel on which PRS signals are to be transmitted.

And thus, determining the availability of the channel on which PRS signals are to be transmitted may comprise listening to a channel that is different than the channel on which the message was transmitted. Means for performing the functionality at block 550 may include one or more software and/or hardware components of an RSU, such as a bus 405, processing unit(s) 410, memory 460, wireless communication interface 430, and/or other software and/or hardware components of the V2X device 400 illustrated in FIG. 4.

At block 560 the functionality of method 500 optionally comprises, responsive to determining that the RF channel on which PRS signals are to be transmitted is available, transmitting a first PRS. Here, the first PRS may comprise an initiating PRS, signaling the beginning of the PRS transmissions for the LBT group, and enabling each vehicle to transmit a responsive PRS and its respective timeslot. As such, the RSU may receive a PRS from a vehicle and therefore may be capable of determining its distance from the vehicle. As such, according to some embodiments, the method 500 may further comprise receiving a second PRS from at least one vehicle of the plurality of vehicles and determining the distance of the at least one vehicle from the RSU based at least in part on the second PRS. Means for performing the functionality at block 560 may include one or more software and/or hardware components of an RSU, such as a bus 405, processing unit(s) 410, memory 460, wireless communication interface 430, and/or other software and/or hardware components of the V2X device 400 illustrated in FIG. 4.

As noted, alternative embodiments may include additional or alternative functions to those illustrated in FIG. 5. According to some embodiments, for example, the RSU may determine an order in which vehicles in the LBT group are to transmit their respective PRS. Accordingly, according to some embodiments the method 500 may further comprise determining the time for each vehicle of the plurality of vehicles to transmit the respective PRS, where, for at least one vehicle of the plurality of vehicles, the determining is based, at least in part, on a location of the at least one vehicle within a section of a road, a location of the at least one vehicle relative to a road hazard, a location of the at least one vehicle relative to one or more other vehicles of the plurality of vehicles, a size of the at least one vehicle, or a speed of the at least one vehicle, or any combination thereof.

The functionality at blocks 550 and 560 are marked as optional because, according to some embodiments, these operations can be performed by a remote vehicle rather than the RSU. That is, according to some embodiments, a remote vehicle may be designated (e.g., by the RSU) as a lead vehicle, responsible for determining whether a PRS channel is clear, and broadcasting the first PRS. (FIG. 2, for example, could be altered to reflect this type alternative functionality by showing Vehicle 1 performing the operations at blocks 260 and 270, rather than the RSU 120.) Some embodiments may enable the RSU to designate a lead vehicle for performing the functionality at blocks 260 and 270 (rather than the RSU) in instances, for example, in which the RSU determines it may be more efficient/effective to do so.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

Figure 6:
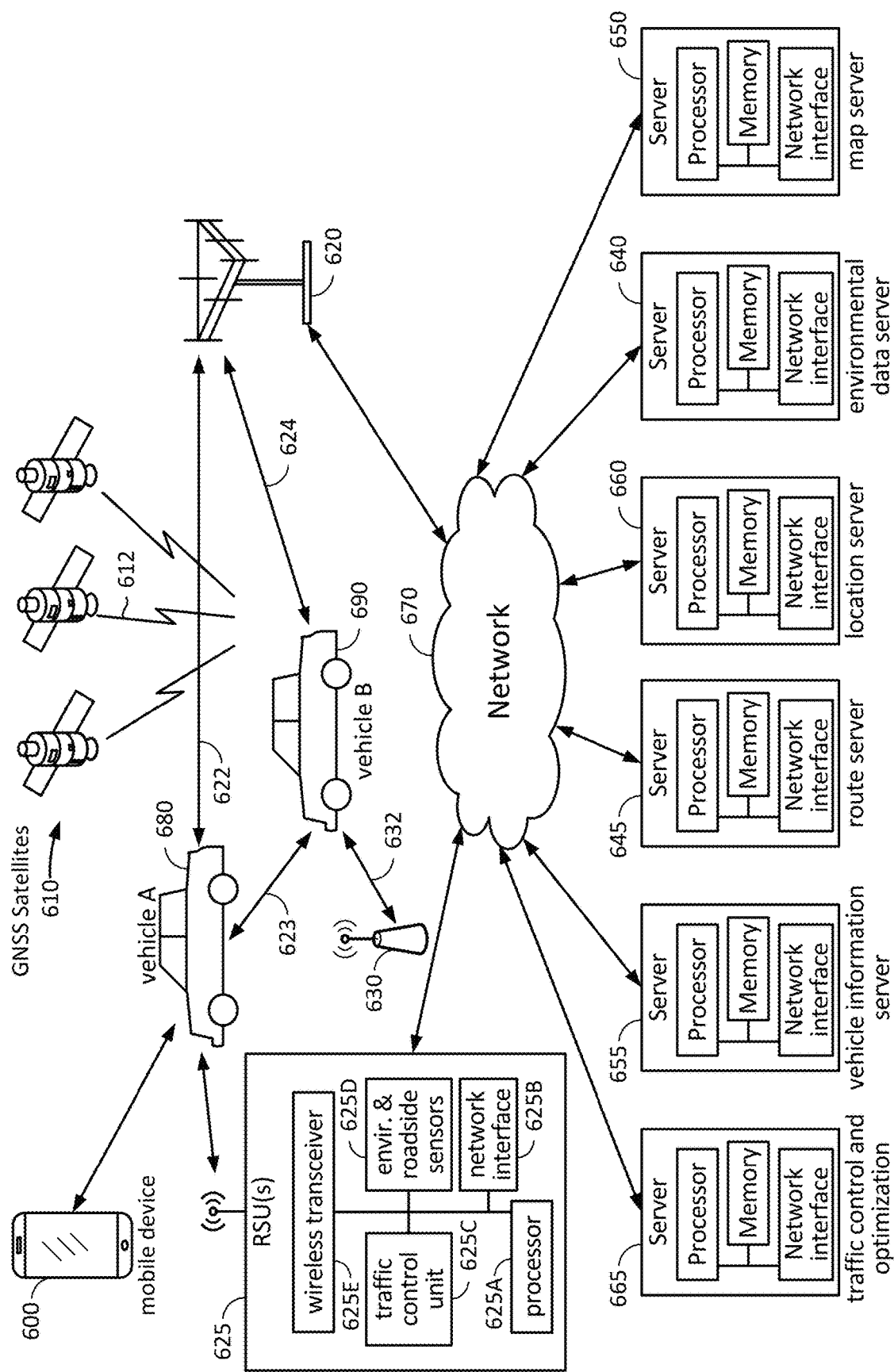
FIG. 6 is an illustration of a system in which vehicles may communicate over various networks and with various devices, vehicles, and servers, according to an embodiment.
Figure 7:
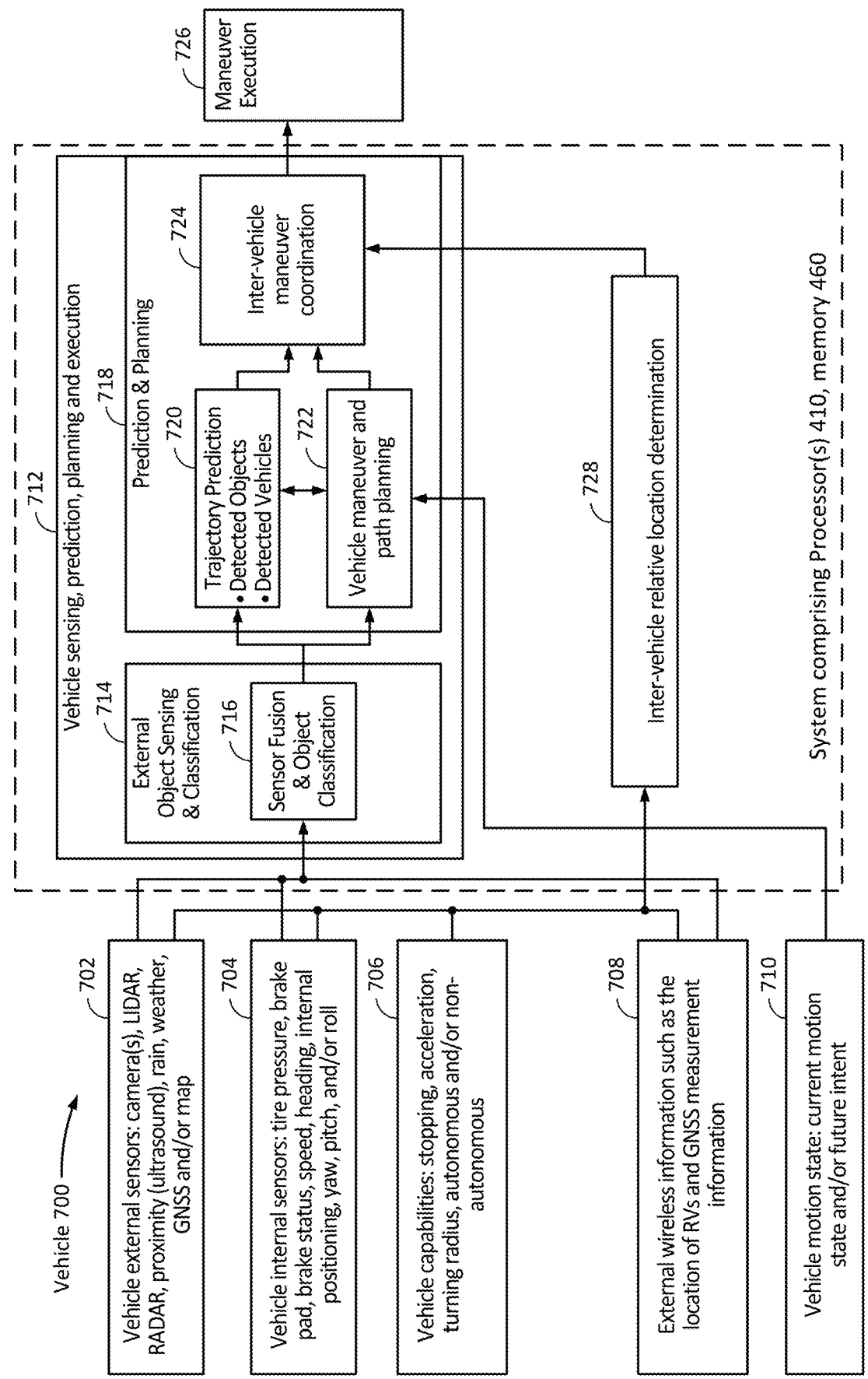
FIG. 7 is a functional block diagram of a vehicle, according to an embodiment.
Figure 8:
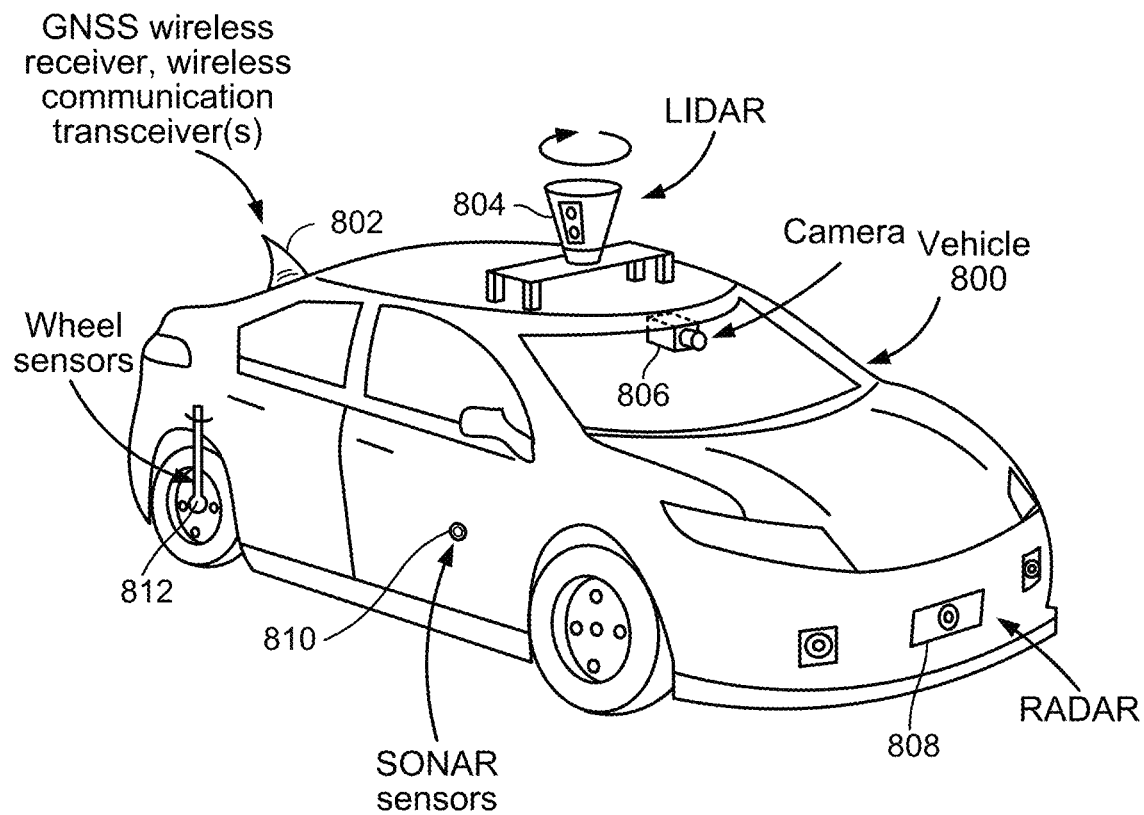
FIG. 8 is a perspective view of an example vehicle, according to an embodiment, capable of communicating location information and PRS transmissions in the manner described herein.

FIGS. 6-8 are illustrations of systems, structural devices, vehicle components, and other devices, components, and systems related to V2X communications, which can be used to implement the techniques provided herein for LBT sensing and coordination of PRS transmissions among a plurality of vehicles, according to some embodiments. It can be noted that some components in these figures (e.g., RSU(s) 625 and vehicles 680, 690, 700, 800) may correspond to like components in the previously-described embodiments and figures (e.g., RSU 120 and vehicles 110).

FIG. 6 is an illustration of a system in which vehicles may communicate over various networks and with various devices, vehicles, and servers, according to an embodiment. In an embodiment, V2X vehicle A 680 may communicate, using V2X or other wireless communication transceiver over link 623, with V2X or otherwise communication-transceiver-enabled vehicle B 690, for example, in an embodiment to perform inter-vehicle relative positioning, negotiation for lane changes or for passage through an intersection, and to exchange V2X data elements such as GNSS measurements, vehicle status, vehicle location and vehicle abilities, measurement data, and/or calculated status, and to exchange other V2X vehicle status steps that may not be covered in the V2X capability data elements. In an embodiment, vehicle A 680 may also communicate with vehicle B 690 through a network, for example, via wireless signals 622/624 to/from base station 620 and/or via wireless signals 632 to/from an access point 630, or via one or more communication-enabled RSU(s) 625, any of which may relay communication, information and/or convert protocols for use by other vehicles, such as vehicle B 690, particularly in an embodiment where vehicle B 690 is not capable of communicating directly with vehicle A 680 in a common protocol. In an embodiment, RSU(s) 625 may comprise various types of roadside beacons, traffic and/or vehicular monitors, traffic control devices, and location beacons. Moreover, as noted earlier, RSU(s) 625 may correspond to RSU 120 illustrated in FIGS. 1-3, and therefore may include components of a V2X device 400 as illustrated in FIG. 4 (which may be used in addition or as an alternative to the components of the RSU(s) 625 illustrated in FIG. 6, which are described below), and which may be configured to perform the method 500 of LBT sensing for PRS transmissions illustrated in FIG. 5.

In an embodiment, RSU(s) 625 may have a processor 625A configured to operate wireless transceiver 625E to send and receive wireless messages, for example, a BSM, CAM, or other V2X messages to/from vehicle A 680 and/or vehicle B 690, from base station 620 and/or access point 630. For example, wireless transceiver 625E may send and/or receive wireless messages in various protocols such as V2X communication with vehicles (e.g., using sidelink communication), and/or using various Wide Area Network (WAN), Wireless Local Area Network (WLAN), and/or Personal Area Network (PAN) protocols to communicate over a wireless communication network. In an embodiment RSU(s) 625 may contain one or more processors 625A communicatively coupled to wireless transceiver 625E and memory, and may contain instructions and/or hardware to perform as a traffic control unit 625C and/or to provide and/or process environmental and roadside sensor information 625D or to act as a location reference for GNSS relative location between it and vehicles. In an embodiment, RSU(s) 625 may contain a network interface 625B (and/or a wireless transceiver 625E), which, in an embodiment, may communicate with external servers such as traffic optimization server 665, vehicle information server 655, and/or environmental data server 640. In an embodiment, wireless transceiver 625E may communicate over a wireless communication network by transmitting or receiving wireless signals from a wireless Base Transceiver Subsystem (BTS), a Node B or an evolved NodeB (eNodeB) or a next generation NodeB (gNodeB) over wireless communication link. In an embodiment, wireless transceiver(s) 625E may comprise various combinations of WAN, WLAN and/or PAN transceivers. In an embodiment, a local transceiver may also be a Bluetooth® transceiver, a ZigBee transceiver, or other PAN transceiver. A local transceiver, a WAN wireless transceiver and/or a mobile wireless transceiver may comprise a WAN transceiver, an access point (AP), femtocell, Home Base Station, small cell base station, Home Node B (HNB), Home eNodeB (HeNB) or next generation NodeB (gNodeB) and may provide access to a wireless local area network (WLAN, e.g., IEEE 802.11 network), a wireless personal area network (PAN, e.g., Bluetooth network) or a cellular network (e.g. an LTE network or other wireless wide area network such as those discussed in the next paragraph). It should be understood that these are merely examples of networks that may communicate with an RSU(s) 625 over a wireless link, and claimed subject matter is not limited in this respect.

RSU(s) 625 may receive location, status, GNSS and other sensor measurements, and capability information from vehicle A 680 and/or vehicle B 690 such as GNSS measurements, sensor measurements, velocity, heading, location, stopping distance, priority or emergency status and other vehicle-related information. In an embodiment, environmental information such as road surface information/status, weather status, and camera information may be gathered and shared with vehicles, either via point to point or broadcast messaging. RSU(s) 625 may utilize received information, via wireless transceiver 625E, from vehicle A 680 and/or vehicle B 690, environmental and roadside sensors 625D, and network information and control messages from, for example, traffic control and optimization server 665 to coordinate and direct traffic flow and to provide environmental, vehicular, safety and announcement messages to vehicle A 680 and vehicle B 690.

Processor 625A may be configured to operate a network interface 625B, in an embodiment, which may be connected via a backhaul to network 670, and which may be used, in an embodiment, to communicate and coordinate with various centralized servers such as a centralized traffic control and optimization server 665 that monitors and optimizes the flow of traffic in an area such as within a city or a section of a city or in a region. Network interface 625B may also be utilized for remote access to RSU(s) 625 for crowd sourcing of vehicle data, maintenance of the RSU(s) 625, and/or coordination with other RSU(s) 625 or other uses. RSU(s) 625 may have a processor 625A configured to operate traffic control unit 625C which may be configured to process data received from vehicles such as vehicle A 680 and vehicle B 690 such as location data, stopping distance data, road condition data, identification data and other information related to the status and location of nearby vehicles and environment. RSU(s) 625 may have a processor 625A configured to obtain data from environmental and roadside sensors 625D, which may include temperature, weather, camera, pressure sensors, road sensors (for car detection, for example), accident detection, movement detection, speed detection and other vehicle and environmental monitoring sensors.

In an embodiment, vehicle A 680 may also communicate with mobile device 600 using short range communication and personal networks such as Bluetooth, Wi-Fi or Zigbee or via V2X (e.g., CV2X/sidelink communications) or other vehicle-related communication protocols, for example, in an embodiment to access WAN and/or Wi-Fi networks and/or, in an embodiment, to obtain sensor and/or location measurements from mobile device 600. In an embodiment, vehicle A 680 may communicate with mobile device 600 using WAN related protocols through a WAN network, such as via WAN base station 620 or using Wi-Fi either directly peer to peer or via a Wi-Fi access point. Vehicle A 680 and/or vehicle B 690 may communicate using various communication protocols. In an embodiment, vehicle A 680 and/or vehicle B 690 may support various and multiple modes of wireless communication such as, for example, using V2X, Global System for Mobile Communications (GSM), Wideband Code Division Multiple Access (WCDMA), Code-division multiple access (CDMA), High Rate Packet Data (HRPD), Wi-Fi, Bluetooth, WiMAX, LTE, 5G new radio access technology (NR) communication protocols, etc.

In an embodiment, vehicle A may communicate over WAN networks using WAN protocols via base station 620 or with wireless LAN access point 630 using wireless LAN protocols such as Wi-Fi. A vehicle may also support wireless communication using a WLAN, PAN (such as Bluetooth or ZigBee), Digital Subscriber Line (DSL) or packet cable for example.

Vehicle A 680 and/or vehicle B 690, in an embodiment, may contain one or more GNSS receivers such as GNSS receiver 480 for reception of GNSS signals 612, from GNSS satellites 610, for location determination, time acquisition and time maintenance. Various GNSS systems may be supported alone or in combination, using GNSS receiver 480 or other receiver, to receive signals from Beidou, Galileo, GLObal NAvigation Satellite System (GLONASS), and/or Global Positioning System (GPS), and various regional navigational systems such as Quasi-Zenith Satellite System (QZSS) and NavIC or Indian Regional Navigation Satellite System (IRNSS). Other wireless systems may be utilized such as those depending on beacons such as, in an example, one or more RSU(s) 625, one or more wireless LAN access point 630 or one or more base stations 620. Various GNSS signals 612 may be utilized in conjunction with car sensors to determine location, velocity, proximity to other vehicles such as between vehicle A 680 and vehicle B 690.

In an embodiment, vehicle A and/or vehicle B may access GNSS measurements and/or locations determined at least in part using GNSS as provided by mobile device 600, which, in an embodiment would also have GNSS, WAN, Wi-Fi and other communications receivers and/or transceivers. In an embodiment, vehicle A 680 and/or vehicle B 690 may access GNSS measurements (such as pseudorange measurements, Doppler measurements and satellite IDs) and/or locations determined at least in part using GNSS as provided by mobile device 600 as a fallback in case GNSS receiver 480 fails or provides less than a threshold level of location accuracy.

Vehicle A 680 and/or Vehicle B 690 may access various servers on the network such as vehicle information server 655, route server 645, location server 660, map server 650, and environmental data server 640.

Vehicle information server 655, may provide information describing various vehicles such as antenna location, vehicle size and vehicle capabilities, as may be utilized in making decisions in regards to maneuvers relative to nearby cars such as whether they are capable of stopping or accelerating in time, whether they are autonomously driven, autonomous driving capable, communications capable. In an embodiment, vehicle information server 655 may also provide information in regard to vehicle size, shape, capabilities, identification, ownership, occupancy, and/or determined location point (such as, for example, the location of the GNSS receiver) and the location of the car boundaries relative to the determined location point.

Route server 645, may receive current location and destination information, and provide routing information for the vehicle, map data, alternative route data and/or traffic and street conditions data.

Location server 660, in an embodiment, may provide location determination capabilities, transmitter signal acquisition assistance (such as GNSS satellite orbital predictions information, time information approximate location information and/or approximate time information), transceiver almanacs such as those containing identification of and location for Wi-Fi access points and base stations, and, in some embodiments, additional information relative to the route such as speed limits, traffic, and road status/construction status. Map server 650 which may provide map data, such as road locations, points of interest along the road, address locations along the roads, road size, road speed limits, traffic conditions, and/or road conditions (wet, slippery, snowy/icy, etc.), road status (open, under construction, accidents, etc.). Environmental data server 640 may, in an embodiment, provide weather and/or road related information, traffic information, terrain information, and/or road quality & speed information and/or other pertinent environmental data.

In an embodiment, Vehicles 680 and 690 and mobile devices 600, in FIG. 6, may communication over network 670 via various network access points such as wireless LAN access point 630 or wireless WAN base station 620 over network 670. Vehicles 680 and 690 and mobile devices 600 may also, in some embodiments, communicate directly between devices, between vehicles and device to vehicle and vehicle to device using various short range communications mechanisms to communicate directly without going over network 670, such as via Bluetooth, Zigbee and 5G new radio standards.

FIG. 7 comprises a functional block diagram of a vehicle 700, according to an embodiment. As noted, a vehicle 700 may comprise a V2X device 400. Accordingly, example hardware and/or software components for executing the blocks shown in FIG. 7 are illustrated in FIG. 4.

As shown in FIG. 7, vehicle 700 may receive vehicle and environment information from vehicle external sensors 702, vehicle internal sensors 704, vehicle capabilities 706, external wireless information such as the location of other vehicles and GNSS measurement information 708 (from the environment, from other vehicles, from RSU(s), from system servers) and/or from vehicle motion state 710 (describing current and/or future motion states). The received vehicle, sensor, and environment information may, in an embodiment, be processed in one or more processor(s) 410, DSP(s) 420, and memory 460 (shown in FIG. 4), connected and configured to provide external object sensing and classification, prediction and planning, and maneuver execution, as well as to determine and update V2X or other wireless data element values, including GNSS data element values, and to transmit, via a wireless communication interface 430, messaging including the determined data elements. The messaging and data elements may be sent and received via various means, protocols and standards, such as via Society of Automotive Engineers (SAE) or European Telecommunications Standards Institute (ETSI) CV2X messages and/or other wireless V2X protocols supported by wireless communication interface 430.

Inter-vehicle relative location determination block 728 may be used to determine relative location of vehicles in an area of interest. In an embodiment, GNSS data is exchanged with vehicles, or other devices such as RSUs, to determine and/or verify and/or increase the accuracy of a relative location associated with other vehicles or devices. In one embodiment, determining vehicles (or other devices) within an area of interest may utilize broadcast location information such as broadcast latitude and longitude received in messages from other vehicles other devices and location information for vehicle 700 to determine an approximate relative location and/or an approximate range between vehicles. Further, as noted in the previously-described embodiments of FIGS. 1-5, PRS transmissions may be used to determine, verify, and/or increase the accuracy of a relative location associated with other vehicles or devices.

In an embodiment, other vehicle-related input sources, such as servers 655, 645, 660, 650, and 640, may provide information such as vehicle information, routing, location assistance, map data and environmental data and provide input on and/or complement and/or be used in conjunction with the other inputs, for example road location data, map data, driving condition data and other vehicle-related data inputs, used in conjunction with inter-vehicle maneuver coordination 724 to determine maneuver execution 726. In an embodiment, the map data may include locations of roadside units relative to the road location, where the vehicle may utilize relative positioning between an RSU in combination with the map data to determine positioning relative to the road surface, particularly in situations where other systems may fail such as due to low visibility weather conditions (snow, rain, sandstorm, etc.). In an embodiment, map data from map server 650 may be utilized in conjunction with relative and/or absolute data from neighboring vehicles and/or from RSU(s) 625 to determine high confidence absolute location for a plurality of vehicles and relative location with respect to the road/map. For example, if vehicle A 680 has more high accuracy/high confidence location than other vehicles in communication with vehicle A 680, such as vehicle B 690 may use GNSS information for a highly accurate relative location and the highly accurate location from vehicle A 680 sent to vehicle B 690 to determine a highly accurate location for vehicle B 690, even if the systems of vehicle B 690 are otherwise unable to calculate a highly accurate location in a particular situation or environment. In this situation, the presence of vehicle A with a highly accurate location determination system provides benefits to all surrounding vehicles by sharing one or more highly accurate locations along with ongoing relative location information. Furthermore, assuming the map data from map server 650 is accurate, the ability to propagate highly accurate location data from vehicle A 680 to surrounding vehicles such as vehicle B 690 enables the surrounding vehicles to also accurately determine their relative location versus the map data, even in otherwise troublesome signal/location environments. Vehicle information server 655 may provide vehicle information such as size, shape, and antenna location which may be utilized, for example, by vehicle A or other vehicles to determine not just the relative location between the GNSS receiver on vehicle A 680 and, for example, vehicle B 690, but also the distance between the closest points of Vehicle A 680 and Vehicle B 690. In an embodiment, traffic information from the traffic control and optimization server 665 may be utilized to determine overall path selection and rerouting, used in conjunction with route server 645 (in an embodiment). In an embodiment, environmental data server 640 may provide input on road conditions, black ice, snow, water on the road and other environmental conditions which may also impact the decisions and decision criteria in inter-vehicle maneuver coordination block 724 and maneuver execution block 726. For example, in icy or rainy conditions, the vehicle 700 may execute and/or request increased inter-vehicle distance from adjacent vehicles or may choose route options that avoid road hazard conditions such as black ice and standing water.

Block 728 may be implemented using various dedicated or generalized hardware and software, such as using processor 410 and/or DSP 420 and memory 460 (again, as shown in FIG. 4) or, in an embodiment, in specialized hardware blocks such as dedicated sensor processing and/or vehicle messaging cores. According to some embodiments, the location of nearby vehicles may be determined through various means such as based on signal-based timing measurements such Round-Trip-Time, Time Of Arrival (TOA), signal strength of a broadcast signal for vehicles, and/or a distance determined based upon broadcast latitude and longitude from a neighboring vehicle and the current location of the vehicle. Additionally or alternatively, location of nearby vehicles may be determined from sensor measurements such as LIght Detection And Ranging (LIDAR), RAdio Detection And Ranging (RADAR), SOund Navigation And Ranging (SONAR), and camera measurements. In an embodiment, some or all of blocks 702, 704, 706, 708 and/or 710 may have dedicated processing cores, for example, to improve performance and reduce measurement latency. In an embodiment, some or all of blocks 702, 704, 706, 708 and/or 710 may share processing with block 728.

Vehicle external sensors 702 may comprise, in some embodiments, cameras, LIDAR, RADAR, SONAR, proximity sensors, rain sensors, weather sensors, GNSS receivers 480 and received data used with the sensors such as map data, environmental data, location, route and/or other vehicle information such as may be received from other vehicles, devices and servers such as, in an embodiment, map server 650, route server 645, vehicle information server 655, environmental data server 640, location server 660, and/or from associated devices such as mobile device 600, which may be present in or near to the vehicle such as vehicle A 680. For example, in an embodiment, mobile device 600 may provide an additional source of GNSS measurements, may provide an additional source of motion sensor measurements, or may provide network access as a communication portal to a WAN, Wi-Fi or other network, and as a gateway to various information servers such as servers 640, 645, 650, 655, 660, and/or 665.

It is understood that the vehicle 700 may contain one or a plurality of cameras. In an embodiment, a camera may be front facing, side facing, rear facing or adjustable in view (such as a rotatable camera). As shown in FIG. 8, for example, there may be multiple cameras 806 facing the same plane. For example, the cameras 806 and bumper-mounted camera at 808 may comprise two front facing cameras, one focused on lower objects and/or a lower point of view (such as bumper mounted) for parking purposes and one focusing on a higher point of view such as to track traffic, other vehicles, pedestrians and more distant objects. In an embodiment, various views may be stitched and/or may be correlated against other inputs such as V2X input from other vehicles to optimize tracking of other vehicles and external entities and objects and/or to calibrate sensor systems against each other. LIDAR 804 may be roof mounted and rotating or may be focused on a particular point of view (such as front facing, rear facing, side facing). LIDAR 804 may be solid state or mechanical. Proximity sensors may be ultrasonic, RADAR-based, light-based (such as based on infrared range finding), and/or capacitive (surface touch oriented or capacitive detection of metallic bodies). Rain and Weather sensors may include various sensing capabilities and technologies such as barometric pressure sensors, moisture detectors, rain sensors, and/or light sensors and/or may leverage other pre-existing sensor systems. GNSS receivers may be roof-mounted, such as in the fin antenna assembly at the rear of the roof of a car, hood or dash mounted or otherwise placed within the exterior or interior of the vehicle.

In an embodiment, vehicle internal sensors 704 may comprise wheel sensors 812 such as tire pressure sensors, brake pad sensors, brake status sensors, speedometers and other speed sensors, heading sensors and/or orientation sensors such as magnetometers and geomagnetic compasses, distance sensors such as odometers and wheel tic sensors, inertial sensors such as accelerometers and gyros as well as inertial positioning results using the above-mentioned sensors, and yaw, pitch and/or roll sensors as may be determined individually or as determined using other sensor systems such as accelerometers, gyros and/or tilt sensors.

Both vehicle internal sensors 704 and vehicle external sensors 702 may have shared or dedicated processing capability. For example, a sensor system or subsystem may have a sensor processing core or cores that determines, based on measurements and other inputs from accelerometers, gyros, magnetometers and/or other sensing systems, car status values such as yaw, pitch, roll, heading, speed, acceleration capability and/or distance, and/or stopping distance. The different sensing systems may communicate with each other to determine measurement values or send values to block 728 to determine vehicle location. The car status values derived from measurements from internal and external sensors may be further combined with car status values and/or measurements from other sensor systems using a general or applications processor. For example, blocks 728 and/or 724 or may be implemented on a dedicated or a centralized processor to determine data element values for V2X messaging which may be sent utilizing wireless communication interface 430 or via other communication transceivers. In an embodiment, the sensors may be segregated into related systems, for example, LIDAR, RADAR, motion, wheel systems, etc., operated by dedicated core processing for raw results to output car status values from each core that are combined and interpreted to derive combined car status values, including capability data elements and status data elements, that may be used to control or otherwise affect car operation and/or as messaging steps shared with other vehicles and/or systems via V2X or other messaging capabilities. These messaging capabilities may be based on, in an embodiment, a variety of wireless-related, light-related or other communication standards, such as those supported by wireless communication interface 430 and antenna(s) 432.

In an embodiment, vehicle capabilities 706 may comprise performance estimates for stopping, breaking, acceleration, and turning radius, and autonomous and/or non-autonomous status and/or capability or capabilities. The capability estimates may be based upon stored estimates, which may be loaded, in an embodiment, into memory. These estimates may be based on empirical performance numbers, either for a specific vehicle, or for averages across one or more vehicles, and/or one or more models for a given performance figure. Where performance estimates for multiple models are averaged or otherwise combined, they may be chosen based on similar or common features. For example, vehicles with similar or the same weight and the same or similar drive train may share performance estimates for drive-performance related estimates such as breaking/stopping distance, turning radius, and acceleration performance. Vehicle performance estimates may also be obtained, for example, using external V2X input(s) 708, over a wireless network from vehicular data servers on the network. This is particularly helpful to obtain information for vehicles that are not wireless capable and cannot provide vehicular information directly. In an embodiment, vehicle capabilities 706 may also be influenced by car component status such as tire wear, tire brand capabilities, brake pad wear, brake brand and capabilities, and engine status. In an embodiment, vehicle capabilities 706 may also be influenced by overall car status such as speed, heading and by external factors such as road surface, road conditions (wet, dry, slipperiness/traction), weather (windy, rainy, snowing, black ice, slick roads, etc.). In many cases, wear, or other system degradation, and external factors such as weather, road surface, road conditions, etc. may be utilized to reduce, validate or improve performance estimates. In some embodiments, actual measured vehicle performance such as measuring vehicular stopping distance and/or acceleration time per distance, may be measured and/or estimated based on actual vehicular driving-related performance. In an embodiment, more recently measured performance may be weighted more heavily or given preference over older measurements, if measurements are inconsistent. Similarly, in an embodiment, measurements taken during similar conditions such as in the same type of weather or on the same type of road surface as is currently detected by the vehicle, such as via vehicle external sensors 702 and/or vehicle internal sensors 704, may be weighted more heavily and/or given preference in determining capability.

V2X vehicle sensing, prediction, planning execution 712 handles the receipt and processing of information from blocks 702, 704, 706, 708 and 710, via external object sensing and classification block 714, in part utilizing sensor fusion and object classification block 716 to correlate, corroborate and/or combine data from input blocks 702, 704, 706, 708 and 710. Block 714 external object sensing and classification determines objects present, determines type of objects (car, truck, bicycle, motorcycle, pedestrian, animal, etc.) and/or object status relative to the vehicle, such as movement status, proximity, heading, and/or position relative to the vehicle, size, threat level, and vulnerability priority (a pedestrian would have a higher vulnerability priority versus road litter, for example). In an embodiment, block 714 may utilize GNSS measurements messages from other vehicles to determine the relative positioning to other vehicles. This output from block 714 may be provided to prediction and planning block 718, which determines detected objects and vehicles and their associated trajectory via block 720 and determines vehicle maneuver and path planning in block 722, the outputs of which are utilized in block 726 vehicle maneuver execution either directly or via V2X inter-vehicle negotiation block 724, which would integrate and account for maneuver planning, location and status received from other vehicles. V2X inter-vehicle negotiation accounts for the status of neighboring vehicles and enables negotiation and coordination between neighboring or otherwise impacted vehicles based on vehicle priority, vehicle capabilities (such as the ability to stop, decelerate or accelerate to avoid collision), and, in some embodiments, various conditions such as weather conditions (rainy, foggy, snow, wind), road conditions (dry, wet, icy, slippery). These include, for example, negotiation for timing and order to pass through an intersection between cars approaching the intersection, negotiation for lane change between adjacent cars, negotiation for parking spaces, negotiation for access to directional travel on a single lane road or to pass another vehicle. Inter-vehicle negotiation may also include time-based and/or distance-based factors such as appointment time, destination distance and estimated route time to reach destination, and, in some embodiments, type of appointment and importance of the appointment.

FIG. 8 is a perspective view of an example vehicle 800, according to an embodiment, capable of sending beacons, PRS transmissions, and/or V2X communications in the manner in the previously-described embodiments. Here, some of the components discussed with regard to FIG. 4 and earlier embodiments are shown. As illustrated and previously discussed, a vehicle 800 can have camera(s) such as rear view mirror-mounted camera 806, front fender-mounted camera (not shown), side mirror-mounted camera (not shown) and a rear camera (not shown, but typically on the trunk, hatch or rear bumper). Vehicle 800 may also have LIDAR 804, for detecting objects and measuring distances to those objects; LIDAR 804 is often roof-mounted, however, if there are multiple LIDAR units 804, they may be oriented around the front, rear and sides of the vehicle. Vehicle 800 may have other various location-related systems such as a GNSS receiver 480 (typically located in the shark fin unit on the rear of the roof, as indicated), various wireless communication interface (such as WAN, WLAN, V2X; typically, but not necessarily, located in the shark fin) 802, RADAR 808 (typically in the front bumper), and SONAR 810 (typically located on both sides of the vehicle, if present). Various wheel sensors 812 and drive train sensors may also be present, such as tire pressure sensors, accelerometers, gyros, and wheel rotation detection and/or counters. In an embodiment, distance measurements and relative locations determined via various sensors such as LIDAR, RADAR, camera, GNSS, and SONAR, may be combined with automotive size and shape information and information regarding the location of the sensor to determine distances and relative locations between the surfaces of different vehicles, such that a distance or vector from a sensor to another vehicle or between two different sensors (such as two GNSS receivers) is incrementally increased to account for the position of the sensor on each vehicle. Thus, an exact GNSS distance and vector between two GNSS receivers would need to be modified based upon the relative location of the various car surfaces to the GNSS receiver. For example, in determining the distance between a rear car's front bumper and a leading car's rear bumper, the distance would need to be adjusted based on the distance between the GNSS receiver and the front bumper on the following car, and the distance between the GNSS receiver of the front car and the rear bumper of the front car. E.g., the distance between the front car's rear bumper and the following car's front bumper is the relative distance between the two GNSS receivers minus the GNSS receiver to front bumper distance of the rear car and minus the GNSS receiver to rear bumper distance of the front car. It is realized that this list is not intended to be limiting and that FIG. 8 is intended to provide exemplary locations of various sensors in an embodiment of a vehicle comprising a V2X 400.

With reference to the appended figures, components that can include memory can include non-transitory machine-readable media. The term "machine-readable medium" and "computer-readable medium" as used herein, refer to any storage medium that participates in providing data that causes a machine to operate in a specific fashion. In embodiments provided hereinabove, various machine-readable media might be involved in providing instructions/code to processing units and/or other device(s) for execution. Additionally or alternatively, the machine-readable media might be used to store and/or carry such instructions/code. In many implementations, a computer-readable medium is a physical and/or tangible storage medium. Such a medium may take many forms, including, but not limited to, non-volatile media, volatile media, and transmission media. Common forms of computer-readable media include, for example, magnetic and/or optical media, any other physical medium with patterns of holes, RAM, a programmable ROM (PROM), erasable programmable ROM (EPROM), a FLASH-EPROM, any other memory chip or cartridge, a carrier wave as described hereinafter, or any other medium from which a computer can read instructions and/or code.

The methods, systems, and devices discussed herein are examples. Various embodiments may omit, substitute, or add various procedures or components as appropriate. For instance, features described with respect to certain embodiments may be combined in various other embodiments. Different aspects and elements of the embodiments may be combined in a similar manner. The various components of the figures provided herein can be embodied in hardware and/or software. Also, technology evolves and, thus, many of the elements are examples that do not limit the scope of the disclosure to those specific examples.

It has proven convenient at times, principally for reasons of common usage, to refer to such signals as bits, information, values, elements, symbols, characters, variables, terms, numbers, numerals, or the like. It should be understood, however, that all of these or similar terms are to be associated with appropriate physical quantities and are merely convenient labels. Unless specifically stated otherwise, as is apparent from the discussion above, it is appreciated that throughout this Specification discussions utilizing terms such as "processing," "computing," "calculating," "determining," "ascertaining," "identifying," "associating," "measuring," "performing," or the like refer to actions or processes of a specific apparatus, such as a special purpose computer or a similar special-purpose electronic computing device. In the context of this Specification, therefore, a special purpose computer or a similar special purpose electronic computing device is capable of manipulating or transforming signals, typically represented as physical electronic, electrical, or magnetic quantities within memories, registers, or other information storage devices, transmission devices, or display devices of the special-purpose computer or similar special-purpose electronic computing device.

Terms, "and" and "or" as used herein, may include a variety of meanings that also is expected to depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, AB, AA, AAB, AABBCCC, etc.

Having described several embodiments, various modifications, alternative constructions, and equivalents may be used without departing from the spirit of the disclosure. For example, the above elements may merely be a component of a larger system, wherein other rules may take precedence over or otherwise modify the application of the various embodiments. Also, a number of steps may be undertaken before, during, or after the above elements are considered. Accordingly, the above description does not limit the scope of the disclosure.

In view of this description embodiments may include different combinations of features. Implementation examples are described in the following numbered clauses:

Clause 1. A method of Listen Before Talk (LBT) sensing for transmitting physical ranging signals among a plurality of vehicles, the method comprising:
obtaining, at a Road Side Unit (RSU), location information regarding the location for each vehicle of the plurality of vehicles;
determining, based on the location information, that each vehicle of the plurality of vehicles is located within a section of a road associated with the RSU;
creating a message, wherein the message is indicative of a time for each vehicle of the plurality of vehicles to transmit a respective Physical Ranging Signal (PRS); and
wirelessly transmitting the message.

Clause 2. The method of Clause 1, further comprising:
determining that a Radio Frequency (RF) channel on which PRS signals are to be transmitted is available; and
responsive to determining that the RF channel on which PRS signals are to be transmitted is available, transmitting a first PRS.

Clause 3. The method of Clause 1 or 2, further comprising determining the time for each vehicle of the plurality of vehicles to transmit the respective PRS, wherein, for at least one vehicle of the plurality of vehicles, the determining is based, at least in part, on:
a location of the at least one vehicle within a section of a road,
a location of the at least one vehicle relative to a road hazard,
a location of the at least one vehicle relative to one or more other vehicles of the plurality of vehicles,
a size of the at least one vehicle, or
a speed of the at least one vehicle, or
any combination thereof.

Clause 4. The method of any of Clauses 1-3, wherein obtaining the location information comprises wirelessly receiving, at the RSU, a beacon from each vehicle of the plurality of vehicles.

Clause 5. The method of any of Clauses 1-4, wherein the message is wirelessly transmitted on a different RF channel than the RF channel on which PRS signals are to be transmitted.

Clause 6. The method of any of Clauses 1-5, wherein the time for each vehicle of the plurality of vehicles to transmit a respective PRS comprises an order of the plurality of vehicles.

Clause 7. The method of any of Clauses 1-5, wherein the time for each vehicle of the plurality of vehicles to transmit a respective PRS comprises a timeslot for each vehicle of the plurality of vehicles.

Clause 8. The method of any of Clauses 1-7, further comprising:
  receiving a second PRS from at least one vehicle of the plurality of vehicles; and
  determining a distance of the at least one vehicle from the RSU based at least in part on the second PRS.

Clause 9. A Road Side Unit (RSU) for Listen Before Talk (LBT) sensing and transmitting physical ranging signals among a plurality of vehicles, the RSU comprising:
  a wireless communication interface;
  a memory; and
  one or more processing units communicatively coupled with the memory and the wireless communication interface and configured to:
    obtain location information regarding the location for each vehicle of the plurality of vehicles;
    determine, based on the location information, that each vehicle of the plurality of vehicles is located within a section of a road associated with the RSU;
    create a message, wherein the message is indicative of a time for each vehicle of the plurality of vehicles to transmit a respective Physical Ranging Signal (PRS); and
    wirelessly transmit the message via the wireless communication interface.

Clause 10. The RSU of Clause 9, wherein the one or more processing units are further configured to:
  determine that a Radio Frequency (RF) channel on which PRS signals are to be transmitted is available; and
  responsive to determining that the RF channel on which PRS signals are to be transmitted is available, transmit a first PRS via the wireless communication interface.

Clause 11. The RSU of Clause 9 or 10, wherein the one or more processing units are further configured to determine the time for each vehicle of the plurality of vehicles to transmit the respective PRS, wherein, for at least one vehicle of the plurality of vehicles, the determining is based, at least in part, on:
  a location of the at least one vehicle within a section of a road,
  a location of the at least one vehicle relative to a road hazard,
  a location of the at least one vehicle relative to one or more other vehicles of the plurality of vehicles,
  a size of the at least one vehicle, or
  a speed of the at least one vehicle, or
  any combination thereof.

Clause 12. The RSU of any of Clauses 9-11, wherein, to obtain the location information, the one or more processing units are configured to wirelessly receive, via the wireless communication interface, a beacon from each vehicle of the plurality of vehicles.

Clause 13. The RSU of any of Clauses 9-12, wherein the one or more processing units are configured to wirelessly transmit the message on a different RF channel than the RF channel on which PRS signals are to be transmitted.

Clause 14. The RSU of any of Clauses 9-13, wherein the one or more processing units are configured to include, in the message, an order of the plurality of vehicles.

Clause 15. The RSU of any of Clauses 9-13, wherein the one or more processing units are configured to include, in the message a timeslot for each vehicle of the plurality of vehicles to transmit the respective PRS.

Clause 16. The RSU of any of Clauses 9-15, wherein the one or more processing units are further configured to:
  receive a second PRS, via the wireless communication interface, from at least one vehicle of the plurality of vehicles; and
  determine a distance of the at least one vehicle from the RSU based at least in part on the second PRS.

Clause 17. A device for Listen Before Talk (LBT) sensing and transmitting physical ranging signals among a plurality of vehicles, the device comprising:
  means for obtaining location information regarding the location for each vehicle of the plurality of vehicles;
  means for determining, based on the location information, that each vehicle of the plurality of vehicles is located within a section of a road associated with the RSU;
  means for creating a message, wherein the message is indicative of a time for each vehicle of the plurality of vehicles to transmit a respective Physical Ranging Signal (PRS); and
  means for wirelessly transmitting the message.

Clause 18. The device of Clause 17, further comprising:
  means for determining that a Radio Frequency (RF) channel on which PRS signals are to be transmitted is available; and
  means for transmitting a first PRS responsive to determining that the RF channel on which PRS signals are to be transmitted is available.

Clause 19. The device of Clause 17 or 18, further comprising means for determining the time for each vehicle of the plurality of vehicles to transmit the respective PRS, wherein, for at least one vehicle of the plurality of vehicles, the determining is based, at least in part, on:
  a location of the at least one vehicle within a section of a road,
  a location of the at least one vehicle relative to a road hazard,
  a location of the at least one vehicle relative to one or more other vehicles of the plurality of vehicles,
  a size of the at least one vehicle, or
  a speed of the at least one vehicle, or
  any combination thereof.

Clause 20. The device of any of Clauses 17-19, wherein the means for obtaining the location information comprise means for wirelessly receiving, at the RSU, a beacon from each vehicle of the plurality of vehicles.

Clause 21. The device of any of Clauses 17-20, further comprising means for wirelessly transmitting the message on a different RF channel than the RF channel on which PRS signals are to be transmitted.

Clause 22. The device of any of Clauses 17-21, further comprising means for including, in the message, an order of the plurality of vehicles.

Clause 23. The device of any of Clauses 17-21, further comprising means for including, in the message, a timeslot for each vehicle of the plurality of vehicles.

Clause 24. The device of any of Clauses 17-23, further comprising:
  means for receiving a second PRS from at least one vehicle of the plurality of vehicles; and
  means for determining a distance of the at least one vehicle from the RSU based at least in part on the second PRS.

Clause 25. A non-transitory computer-readable medium having instructions embedded therewith for Listen Before Talk (LBT) sensing and transmitting physical ranging signals among a plurality of vehicles, wherein the instructions, when executed by one or more processing units, cause the one or more processing units to:
  obtain location information regarding the location for each vehicle of the plurality of vehicles;
  determine, based on the location information, that each vehicle of the plurality of vehicles is located within a section of a road associated with the RSU;
  create a message, wherein the message is indicative of a time for each vehicle of the plurality of vehicles to transmit a respective Physical Ranging Signal (PRS); and
  wirelessly transmit the message.

Clause 26. The non-transitory computer-readable medium of Clause 25, wherein the instructions, when executed by one or more processing units, further cause the one or more processing units to:
  determine that a Radio Frequency (RF) channel on which PRS signals are to be transmitted is available; and
  responsive to determining that the RF channel on which PRS signals are to be transmitted is available, transmit a first PRS.

Clause 27. The non-transitory computer-readable medium of Clause 25 or 26, wherein the instructions, when executed by one or more processing units, further cause the one or more processing units to determine the time for each vehicle of the plurality of vehicles to transmit the respective PRS, wherein, for at least one vehicle of the plurality of vehicles, the determining is based, at least in part, on:
  a location of the at least one vehicle within a section of a road,
  a location of the at least one vehicle relative to a road hazard,
  a location of the at least one vehicle relative to one or more other vehicles of the plurality of vehicles,
  a size of the at least one vehicle, or
  a speed of the at least one vehicle, or
  any combination thereof.

Clause 28. The non-transitory computer-readable medium of any of Clauses 25-27, wherein the instructions, when executed by one or more processing units, further cause the one or more processing units to obtain the location information at least in part by wirelessly receiving, at the RSU, a beacon from each vehicle of the plurality of vehicles.

Clause 29. The non-transitory computer-readable medium of any of Clauses 25-28, wherein the instructions, when executed by one or more processing units, further cause the one or more processing units to wirelessly transmit the message on a different RF channel than the RF channel on which PRS signals are to be transmitted.

Clause 30. The non-transitory computer-readable medium of any of Clauses 25-29, wherein the instructions, when executed by one or more processing units, further cause the one or more processing units to:
  receiving a second PRS from at least one vehicle of the plurality of vehicles; and
  determining a distance of the at least one vehicle from the RSU based at least in part on the second PRS.

What is claimed is:

1. A method of Listen Before Talk (LBT) sensing for transmitting physical ranging signals among a plurality of vehicles, the method comprising:
  obtaining, at a Road Side Unit (RSU), location information regarding the location for each vehicle of the plurality of vehicles;
  determining, based on the location information, that each vehicle of the plurality of vehicles is located within a section of a road associated with the RSU;
  creating a message, wherein the message is indicative of a sequence of Physical Ranging Signal (PRS) transmissions by vehicles of the plurality of vehicles;
  wirelessly transmitting the message;
  determining that a Radio Frequency (RF) channel on which PRS signals are to be transmitted is available; and
  responsive to determining that the RF channel on which PRS signals are to be transmitted is available, initiating the sequence of PRS transmissions by transmitting a first PRS.

2. The method of claim 1, further comprising determining an order of the sequence of PRS transmissions, wherein, for at least one vehicle of the plurality of vehicles, a place of a respective PRS transmission of the at least one vehicle within the order is based, at least in part, on:
  a location of the at least one vehicle within a section of a road,
  a location of the at least one vehicle relative to a road hazard,
  a location of the at least one vehicle relative to one or more other vehicles of the plurality of vehicles,
  a size of the at least one vehicle, or
  a speed of the at least one vehicle, or
  any combination thereof.

3. The method of claim 1, wherein obtaining the location information comprises wirelessly receiving, at the RSU, a beacon from each vehicle of the plurality of vehicles.

4. The method of claim 1, wherein the message is wirelessly transmitted on a different RF channel than the RF channel on which PRS signals are to be transmitted.

5. The method of claim 1, wherein the message comprises a timeslot for each vehicle of the plurality of vehicles.

6. The method of claim 1, further comprising:
  receiving a second PRS from at least one vehicle of the plurality of vehicles; and
  determining a distance of the at least one vehicle from the RSU based at least in part on the second PRS.

7. A Road Side Unit (RSU) for Listen Before Talk (LBT) sensing and transmitting physical ranging signals among a plurality of vehicles, the RSU comprising:
  a wireless communication interface;
  a memory; and
  one or more processing units communicatively coupled with the memory and the wireless communication interface and configured to:
    obtain location information regarding the location for each vehicle of the plurality of vehicles;
    determine, based on the location information, that each vehicle of the plurality of vehicles is located within a section of a road associated with the RSU;
    create a message, wherein the message is indicative of a sequence of Physical Ranging Signal (PRS) transmissions by vehicles of the plurality of vehicles;
    wirelessly transmit the message via the wireless communication interface;
    determine that a Radio Frequency (RF) channel on which PRS signals are to be transmitted is available; and
    responsive to determining that the RF channel on which PRS signals are to be transmitted is available, initiate the sequence of PRS transmissions by transmitting a first PRS.

8. The RSU of claim 7, wherein the one or more processing units are further configured to determine an order of sequence of PRS transmissions, wherein, for at least one vehicle of the plurality of vehicles, a place of a respective PRS transmission of the at least one vehicle within the order is based is based, at least in part, on:
a location of the at least one vehicle within a section of a road,
a location of the at least one vehicle relative to a road hazard,
a location of the at least one vehicle relative to one or more other vehicles of the plurality of vehicles,
a size of the at least one vehicle, or
a speed of the at least one vehicle, or
any combination thereof.

9. The RSU of claim 7, wherein, to obtain the location information, the one or more processing units are configured to wirelessly receive, via the wireless communication interface, a beacon from each vehicle of the plurality of vehicles.

10. The RSU of claim 7, wherein the one or more processing units are configured to wirelessly transmit the message on a different RF channel than the RF channel on which PRS signals are to be transmitted.

11. The RSU of claim 7, wherein the one or more processing units are configured to include, in the sequence of PRS transmissions a timeslot for each vehicle of the plurality of vehicles to transmit the respective PRS.

12. The RSU of claim 7, wherein the one or more processing units are further configured to:
receive a second PRS, via the wireless communication interface, from at least one vehicle of the plurality of vehicles; and
determine a distance of the at least one vehicle from the RSU based at least in part on the second PRS.

13. A device for Listen Before Talk (LBT) sensing and transmitting physical ranging signals among a plurality of vehicles, the device comprising:
means for obtaining location information regarding the location for each vehicle of the plurality of vehicles;
means for determining, based on the location information, that each vehicle of the plurality of vehicles is located within a section of a road associated with a Road Side Unit (RSU);
means for creating a message, wherein the message is indicative of a sequence of Physical Ranging Signal (PRS) transmissions by vehicles of the plurality of vehicles;
means for wirelessly transmitting the message;
means for determining that a Radio Frequency (RF) channel on which PRS signals are to be transmitted is available; and
means for, responsive to determining that the RF channel on which PRS signals are to be transmitted is available, initiating the sequence of PRS transmissions by transmitting a first PRS.

14. The device of claim 13, further comprising means for determining an order of the sequence of PRS transmissions, wherein, for at least one vehicle of the plurality of vehicles, a place of a respective PRS transmission of the at least one vehicle within the order is based, at least in part, on:
a location of the at least one vehicle within a section of a road,
a location of the at least one vehicle relative to a road hazard,
a location of the at least one vehicle relative to one or more other vehicles of the plurality of vehicles,
a size of the at least one vehicle, or
a speed of the at least one vehicle, or
any combination thereof.

15. The device of claim 13, wherein the means for obtaining the location information comprise means for wirelessly receiving, at the RSU, a beacon from each vehicle of the plurality of vehicles.

16. The device of claim 13, further comprising means for wirelessly transmitting the message on a different RF channel than the RF channel on which PRS signals are to be transmitted.

17. The device of claim 13, further comprising means for including, in the message, a timeslot for each vehicle of the plurality of vehicles.

18. The device of claim 13, further comprising:
means for receiving a second PRS from at least one vehicle of the plurality of vehicles; and
means for determining a distance of the at least one vehicle from the RSU based at least in part on the second PRS.

19. A non-transitory computer-readable medium having instructions embedded therewith for Listen Before Talk (LBT) sensing and transmitting physical ranging signals among a plurality of vehicles, wherein the instructions, when executed by one or more processing units, cause the one or more processing units to:
obtain location information regarding the location for each vehicle of the plurality of vehicles;
determine, based on the location information, that each vehicle of the plurality of vehicles is located within a section of a road associated with a Road Side Unit (RSU);
create a message, wherein the message is indicative of a sequence of Physical Ranging Signal (PRS) transmissions by vehicles of the plurality of vehicles;
wirelessly transmit the message;
determine that a Radio Frequency (RF) channel on which PRS signals are to be transmitted is available; and
responsive to determining that the RF channel on which PRS signals are to be transmitted is available, initiate the sequence of PRS transmissions by transmitting a first PRS.

20. The non-transitory computer-readable medium of claim 19, wherein the instructions, when executed by one or more processing units, further cause the one or more processing units to determine an order of the sequence of PRS transmissions, wherein, for at least one vehicle of the plurality of vehicles, a place of a respective PRS transmission of the at least one vehicle within the order is based, at least in part, on:
a location of the at least one vehicle within a section of a road,
a location of the at least one vehicle relative to a road hazard,
a location of the at least one vehicle relative to one or more other vehicles of the plurality of vehicles,
a size of the at least one vehicle, or
a speed of the at least one vehicle, or
any combination thereof.

21. The non-transitory computer-readable medium of claim 19, wherein the instructions, when executed by one or more processing units, further cause the one or more processing units to obtain the location information at least in part by wirelessly receiving, at the RSU, a beacon from each vehicle of the plurality of vehicles.

22. The non-transitory computer-readable medium of claim 19, wherein the instructions, when executed by one or more processing units, further cause the one or more processing units to wirelessly transmit the message on a different RF channel than the RF channel on which PRS signals are to be transmitted.

23. The non-transitory computer-readable medium of claim 19, wherein the instructions, when executed by one or more processing units, further cause the one or more processing units to:
   receive a second PRS from at least one vehicle of the plurality of vehicles; and
   determine a distance of the at least one vehicle from the RSU based at least in part on the second PRS.

* * * * *